United States Patent
Alonso et al.

(10) Patent No.: US 10,824,675 B2
(45) Date of Patent: Nov. 3, 2020

(54) RESOURCE-EFFICIENT GENERATION OF A KNOWLEDGE GRAPH

(71) Applicant: Microsoft Technology Licensing, LLC, Redmond, WA (US)

(72) Inventors: Omar Rogelio Alonso, Redwood Shores, CA (US); Vasileios Kandylas, Sunnyvale, CA (US); Rukmini Iyer, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 422 days.

(21) Appl. No.: 15/815,726

(22) Filed: Nov. 17, 2017

(65) Prior Publication Data

US 2019/0155961 A1 May 23, 2019

(51) Int. Cl.
| | | |
|---|---|---|
| G06F 16/30 | (2019.01) | |
| G06F 16/901 | (2019.01) | |
| G06N 5/02 | (2006.01) | |
| G06F 16/28 | (2019.01) | |
| G06F 16/242 | (2019.01) | |
| G06F 16/951 | (2019.01) | |
| G06Q 10/04 | (2012.01) | |

(52) U.S. Cl.
CPC ...... *G06F 16/9024* (2019.01); *G06F 16/2425* (2019.01); *G06F 16/284* (2019.01); *G06F 16/951* (2019.01); *G06N 5/022* (2013.01); *G06Q 10/04* (2013.01)

(58) Field of Classification Search
CPC .................................................. G06F 16/9024
See application file for complete search history.

(56) References Cited

U.S. PATENT DOCUMENTS

| | | |
|---|---|---|
| 9,171,081 B2 | 10/2015 | Ganjam et al. |
| 9,378,202 B2 | 6/2016 | Larcheveque et al. |
| 9,378,239 B1 | 6/2016 | Long et al. |
| 9,443,209 B2 | 9/2016 | Parikh et al. |
| 9,672,530 B2 | 6/2017 | Judd et al. |
| 2012/0259801 A1 | 10/2012 | Ji et al. |

(Continued)

OTHER PUBLICATIONS

Article entitled "Building the LinkedIn Knowledge Graph", dated Oct. 6, 2016, by He.*

(Continued)

*Primary Examiner* — Mahesh H Dwivedi

(57) ABSTRACT

A technique is described for generating a knowledge graph that links names associated with a first subject matter category (C1) (such as brands) with names associated with a second subject matter category (C2) (such as products). In one implementation, the technique relies on two similarly-constituted processing pipelines, a first processing pipeline for processing the C1 names, and a second processing pipeline for processing the C2 names. Each processing pipeline includes three main stages, including a name-generation stage, a verification stage, and an augmentation stage. The generation stage uses a voting strategy to form an initial set of seed names. The verification stage removes noisy seed names. And the augmentation stage expands each verified name to include related terms. A final edge-forming stage identifies relationships between the expanded C1 names and the expanded C2 names using a voting strategy.

21 Claims, 12 Drawing Sheets

(56) References Cited

U.S. PATENT DOCUMENTS

| | | | |
|---|---|---|---|
| 2012/0317088 | A1 | 12/2012 | Pantel et al. |
| 2013/0013416 | A1 | 1/2013 | Stein |
| 2015/0332672 | A1* | 11/2015 | Akbacak ............... G06F 16/637 704/257 |
| 2016/0103932 | A1* | 4/2016 | Sathish ................. G06F 9/4451 715/767 |
| 2016/0379120 | A1* | 12/2016 | Merdivan ........... G06F 16/3329 706/46 |
| 2017/0068903 | A1 | 3/2017 | Hakkani-Tur et al. |
| 2017/0132329 | A1* | 5/2017 | Yakout ................ G06F 16/9024 |
| 2017/0193393 | A1* | 7/2017 | Contractor ............. G06N 5/022 |
| 2017/0270006 | A1* | 9/2017 | Kandylas ............ G06F 11/1446 |
| 2018/0210913 | A1* | 7/2018 | Beller ................... G06F 16/243 |
| 2019/0005163 | A1* | 1/2019 | Farrell ....................... G06F 8/00 |
| 2019/0019088 | A1* | 1/2019 | Wang ..................... G06N 5/022 |
| 2019/0080245 | A1* | 3/2019 | Hickman ............. G06K 9/6296 |

OTHER PUBLICATIONS

Article entitled "Learning Entity Types from Query Logs via Graph-Based Modeling", dated Oct. 23, 2015, by Zhang et al.*

Article entitled "Unsupervised Construction of a Product Knowledge Graph", by Alonso et al., Copyright 2019.*

Fang, et al., "From Appearance to Essence: Comparing Truth Discovery Methods without Using Ground Truth," in arXiv:1708.02029v1 [cs.DB], Aug. 7, 2017, 11 pages.

Pujara, et al., "Knowledge Graph Identification," available at <<http://repository.cmu.edu/cgi/viewcontent.cgi?article=1021&context=machine_learning>>, Carnegie Mellon University Research Showcase, Oct. 2013, 17 pages.

Xie, et al., "Does William Shakespeare Really Write Hamlet? Knowledge Representation Learning with Confidence," in arXiv:1705.03202v1 [cs.CL], May 9, 2017, 7 pages.

Zhang, et al., "Entity Set Expansion via Knowledge Graphs," in Proceedings of the 40th International ACM SIGIR Conference on Research and Development in Information Retrieval, Aug. 7, 2017, 4 pages.

Schmarzo, Bill, "How Can Graph Analytics Uncover Valuable Insights About Data," available at << https://infocus.emc.com/william_schmarzo/how-can-graph-analytics-uncover-valuable-insights-about-data/>>, Dell EMC InFocus Newsletter, Jan. 31, 2014, 9 pages.

Newman, et al., "Finding and evaluating community structure in networks," in arXiv:cond-mat/0308217v1 [cond-mat.stat-mech], Aug. 11, 2003, 19 pages.

PCT Search and Written Opinion for PCT Application No. PCT/US2018/060199, dated Feb. 5, 2019, 16 pages.

Cimiano, Philipp, "Knowledge Graph Refinement: A Survey of Approaches and Evaluation Methods," Semantic Web., vol. 8, No. 3, Dec. 2016, 23 pages.

Liu, et al., "Towards Linked Data Fact Validation through Measuring Consensus," available at <<http://ceur-ws.org/Vol-1376/LDQ2015_paper_04.pdf>>, in Proceedings of the 2nd Workshop on Linked Data Quality, Jun. 2015, 8 pages.

Deshpande, et al., "Building, Maintaining, and Using Knowledge Bases: A Report from the Trenches," in Proceedings of the 2013 ACM SIGMOD International Conference on Management of Data, Jun. 2013, pp. 1209-1220.

Lockard, et al., "CERES: Distantly Supervised Relation Extraction from the Semi-Structured Web," in Proceedings of the VLDB Endowment, vol. 11, No. 10, Aug. 2018, pp. 1084-1096.

Shen, et al., "Learning Semantic Representations Using Convolutional Neural Networks for Web Search," in Proceedings of the 23rd International Conference on World Wide Web, Apr. 2014, pp. 373-374.

Weikum, et al., "Ten Years of Knowledge Harvesting: Lessons and Challenges," in IEEE Data Eng. Bull. vol. 39(3), 2016, pp. 41-50.

Zheng, et al., "OpenTag: Open Attribute Value Extraction from Product Profiles," in Proceedings of the 24th ACM SIGKDD International Conference on Knowledge Discovery & Data Mining, Aug. 2018, pp. 1049-1058.

Dong, Xin Luna, "Building a Broad Knowledge Graph for Products," available at http://conferences.cis.umac.mo/icde2019/wp-content/uploads/2019/06/icde-2019-keynote-luna-dong.pdf, 35th IEEE International Conference on Data Engineering, ICDE 2019, Apr. 2019, accessed on May 18, 2020, 73 pages.

Krishnan, Arun, "Making search easier: How Amazon's Product Graph is helping customers find products more easily," available at https://blog.aboutamazon.com/innovation/making-search-easier, published Aug. 17, 2018, accessed on May 18, 2020, 7 pages.

* cited by examiner

OVERVIEW OF OPERATION OF THE COMPUTING ENVIRONMENT OF FIG. 1 (FIGS. 10-12)
1002

GENERATE A SET OF SEED FIRST-CATEGORY (C1) NAMES ASSOCIATED WITH A FIRST SUBJECT MATTER CATEGORY, THE GENERATING OPERATION INCLUDING COLLECTING TWO OR MORE SETS OF CANDIDATE C1 NAMES FROM RESPECTIVE C1 SEED SOURCES OF SEED INFORMATION, AND USING A VOTING COMPONENT TO GENERATE THE SET OF SEED C1 NAMES BASED ON THE SET(S) OF CANDIDATE C1 NAMES
1004

VERIFY WHETHER THE SEED C1 NAMES HAVE A PRESCRIBED PRESENCE WITH RESPECT TO AN ONLINE COMMUNITY, TO GENERATE A SET OF VERIFIED C1 NAMES
1006

AUGMENT EACH VERIFIED C1 NAME IN THE SET OF VERIFIED C1 NAMES BY PERFORMING CLUSTERING ON QUERY INFORMATION DERIVED FROM A QUERY-CLICK LOG, TO GENERATE A SET OF EXPANDED C1 NAMES
1008

GENERATE A SET OF SEED SECOND-CATEGORY (C2) NAMES ASSOCIATED WITH A SECOND SUBJECT MATTER CATEGORY, THE GENERATING OPERATION INCLUDING COLLECTING TWO OR MORE SETS OF CANDIDATE C2 NAMES FROM RESPECTIVE C2 SEED SOURCES OF SEED INFORMATION, AND USING A VOTING COMPONENT TO GENERATE THE SET OF SEED C2 NAMES BASED ON THE SET(S) OF CANDIDATE C2 NAMES
1102

VERIFY WHETHER THE SEED C2 NAMES HAVE A PRESCRIBED PRESENCE WITH RESPECT TO AN ONLINE COMMUNITY, TO GENERATE A SET OF VERIFIED C2 NAMES
1104

AUGMENT EACH VERIFIED C2 NAME IN THE SET OF VERIFIED C2 NAMES BY PERFORMING CLUSTERING ON QUERY INFORMATION DERIVED FROM THE QUERY-CLICK LOG, TO OVERALL GENERATE A SET OF EXPANDED C2 NAMES
1106

```
┌─────────────────────────────────────────────────────────────┐
│ FORM EDGES BETWEEN PAIRS OF NODES ASSOCIATED WITH THE SET OF EXPANDED │
│   C1 NAMES AND THE SET OF EXPANDED C2 NAMES, TO PRODUCE A KNOWLEDGE  │
│   GRAPH, EACH EDGE CONNECTING A PARTICULAR EXPANDED C1 NAME AND A    │
│   PARTICULAR EXPANDED C2 NAME. (MORE GENERALLY, FORM EDGES BETWEEN C1│
│   NODES ASSOCIATED WITH THE SET OF EXPANDED C1 NAMES AND OTHER NODES.)│
│                            1202                              │
└─────────────────────────────────────────────────────────────┘
                              ↓
           ┌──────────────────────────────────────┐
           │       REVISE KNOWLEDGE GRAPH         │
           │               1204                   │
           └──────────────────────────────────────┘
                              ↓
┌─────────────────────────────────────────────────────────────┐
│ TRANSFER THE KNOWLEDGE GRAPH TO AN APPLICATION SYSTEM FOR USE THEREAT│
│              IN ANSWERING USER INPUT QUERIES                 │
│                            1206                              │
└─────────────────────────────────────────────────────────────┘
── ── ── ── ── ── ── ── ── ── ── ── ── ── ── ── ── ── ── ── ──
                    APPLICATION PHASE
                              ↓
┌─────────────────────────────────────────────────────────────┐
│     RECEIVE AN INPUT QUERY FROM A USER COMPUTING DEVICE      │
│                            1208                              │
└─────────────────────────────────────────────────────────────┘
                              ↓
┌─────────────────────────────────────────────────────────────┐
│     USE THE KNOWLEDGE BASE TO PROVIDE AN ANSWER TO THE INPUT QUERY │
│                            1210                              │
└─────────────────────────────────────────────────────────────┘
                              ↓
┌─────────────────────────────────────────────────────────────┐
│          SEND THE ANSWER TO THE USER COMPUTING DEVICE        │
│                            1212                              │
└─────────────────────────────────────────────────────────────┘
```

RESOURCE-EFFICIENT GENERATION OF A KNOWLEDGE GRAPH

BACKGROUND

A knowledge graph refers to information structured as a series of nodes and edges. In one case, the nodes represent different respective instances of two or more subject matter categories, and the edges represent relationships among the instances. For instance, a bipartite knowledge graph may represent the relationships of U.S. states to the cities within those states; here, the first subject matter category represents states, while the second subject matter category represents cities. The edges connect instances of states (state nodes) to instances of cities (city nodes).

The task of generating a knowledge graph is labor-intensive in nature. Hence, the technical literature describes computer-implemented techniques to automate at least some aspects of this operation. Some such techniques rely heavily on the use of machine-trained models to automatically extract relations expressed within a training dataset. While a machine-trained model may provide adequate performance in some cases, it may otherwise not provide a fully satisfactory solution for the technical reasons specified herein.

SUMMARY

A technique is described herein for generating a knowledge graph that links at least names associated with a first subject matter category (C1) (such as brands) with names associated with a second subject matter category (C2) (such as products). The technique relies on two similarly-constituted processing pipelines, a first processing pipeline for processing the C1 names, and a second processing pipeline for processing the C2 names.

More generally, the technique can be applied to establish links between names associated with any two or more categories. However, to facilitate explanation, the technique will be principally described in the context of establishing links between names of two categories (C1, C2), with the understanding the technique can duplicate this base operation with respect to any number of additional categories (C3, C4, . . . ). Furthermore, the technique will be principally described in the context in which its operations establish edges between names associated with different categories. But the technique can also be used to establish relationships between names associated with any single category.

Each processing pipeline includes three main stages. Consider the illustrative case of the pipeline for processing C1 names. A generation component uses a voting strategy to generate a set of seed C1 names, based on two or more sources of information. A verification component removes or otherwise discounts seed C1 names that are determined to lack a prescribed presence within an online community, to produce a set of verified C1 names. An augmentation component leverages information in a query-click log to expand each verified C1 name into a group of related C1 names, e.g., containing synonyms of the verified C1 name. This yields a set of expanded C1 names, where each such expanded C1 name encompasses a group of related C1 names. The second processing pipeline executes the same three stages to generate a set of expanded C2 names.

An edge formation component then identifies connections between pairs of nodes associated with the set of expanded C1 names and the set of expanded C2 names. That is, each edge connects a particular expanded C1 name (corresponding to a C1 node) with a particular expanded C2 name (corresponding to a C2 node).

As will be described in detail herein, the above-summarized technique for generating a knowledge graph is resource-efficient, relatively quick, and relatively easy to troubleshoot. It also has broad application to different subject matter domains.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 10-12 together show a flowchart that represents one manner of operation of the system environment of FIG. 1.

Figure 1:
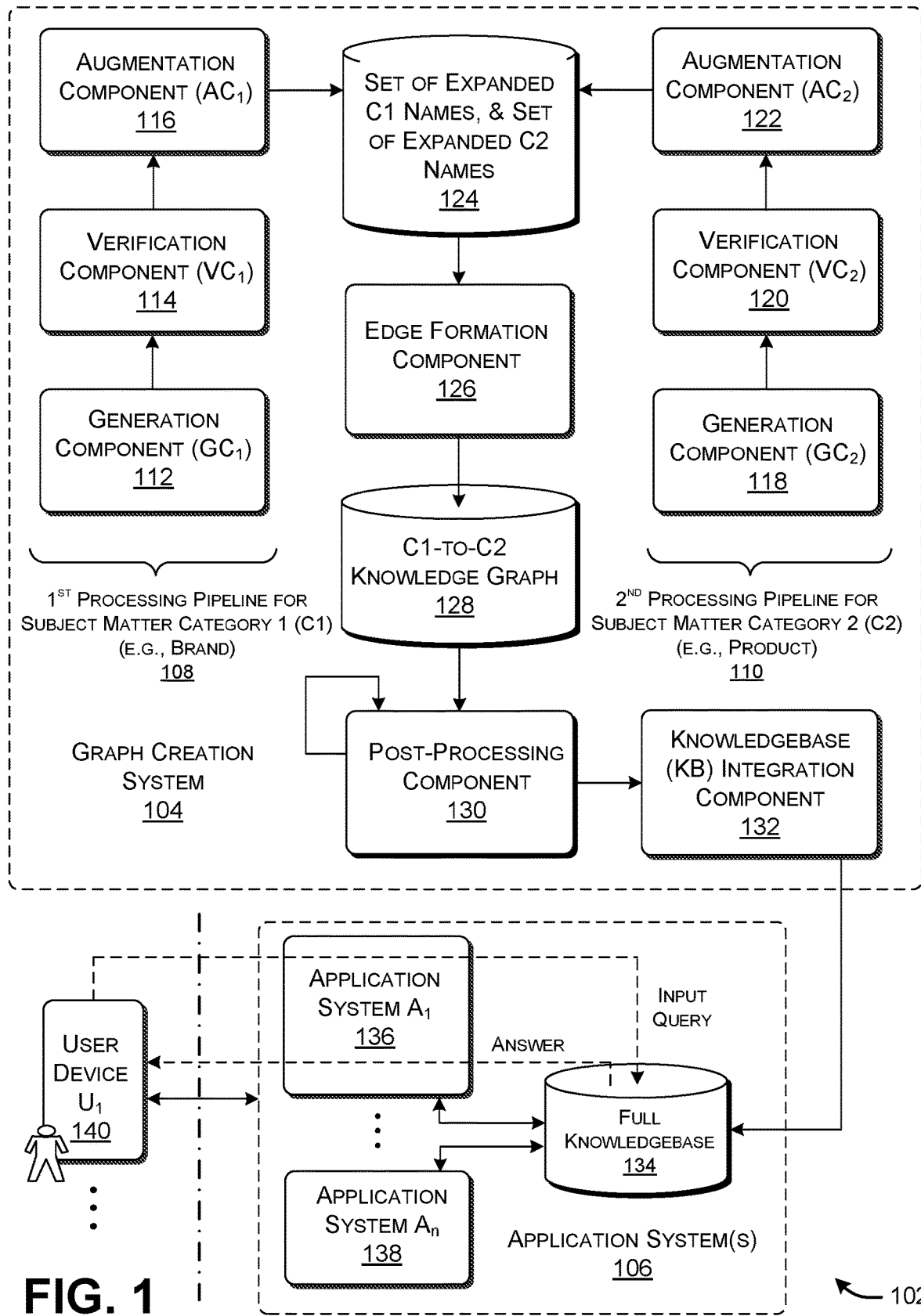
FIG. 1 shows an illustrative computing environment that includes a graph creation system and one or more application systems.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for generating and applying a knowledge graph. Section B sets forth illustrative methods which explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic components (e.g., FPGAs) that perform operations using a task-specific collection of fixed and/or programmable logic gates. Section C provides additional information regarding one implementation of the hardware logic circuitry.

The terms "component," "unit," "element," etc. refer to a part of the hardware logic circuitry that performs a particular function. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic components that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical component that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

A.1. Overview

FIG. 1 shows an illustrative computing environment 102 that includes a graph creation system 104 and one or more application systems 106. The graph creation system 104 generates a knowledge graph, while each application system applies the knowledge graph to provide some service to an end user.

At a minimum, a knowledge graph represents a bipartite graph that links at least nodes associated with a first subject matter category (C1) with nodes associated with a second subject matter category (C2). That is, the C1 nodes represent C1 names associated with the first subject matter category, while the C2 nodes represent C2 names associated with the second subject matter category. The link between any C1 node and any C2 node represents a relationship between a C1 name (or, more specifically, a group of related C1 names) and a C2 name (or, more specifically, a group of related C2 names).

A name, as the term is used herein, represents a text string composed of one or more tokens, such as words or other information-bearing units. In other words, a name corresponds to a word-based n-gram. For instance, the string "WINDOWS 10" is a name that include two tokens, "WINDOW" and "10."

To facilitate explanation, the following description will be framed in an illustrative context in which the first subject matter category (C1) corresponds to brands, while the second subject matter category (C2) correspond to products. As such, any C1 node in the knowledge graph represents one or more names that describe a single brand. For instance, an illustrative C1 node may correspond to a group of names that includes MICROSOFT, MSFT, MS, MICROSOFT CORPORATION, etc., all associated with the company Microsoft Corporation of Redmond, Wash. An illustrative C2 node may correspond to a group of names that includes WINDOWS, OUTLOOK, KINECT, HOLOLENS, XBOX, etc., all associated with products produced by Microsoft Corporation. A "brand name" corresponds to a name that describes a brand, while a "product name" corresponds to a name that describes a product.

However, the computing environment 102 can produce any knowledge graph that links two subject matter categories together of any nature. For example, in another case, the C1 nodes can correspond to sports teams, while the C2 nodes can correspond to players who are affiliated with various teams. In another case, the C1 nodes can correspond to jurisdictions, while the C2 nodes can correspond to entities that are affiliated with various jurisdictions, and so on. Moreover, the edges in a graph can represent relatedness based on any criteria. For example, an edge between two nodes may represent a hierarchical relationship, a causal relationship, a temporal relationship, etc.

This subsection provides an overview of the graph creation system 104 and the application system(s) 106. Later subsections provide additional information regarding individual respective parts of the graph creation system 104.

The graph creation system 104 can be conceptualized as being composed of at least two processing pipelines (108, 110). The first processing pipeline 108 processes C1 names associated with the first subject matter category. The second processing pipeline processes C2 names associated with the second subject matter category. Again, to facilitate explanation, the two processing pipelines (108, 110) will be henceforth explained in the non-limiting context of brands and products.

In one implementation, the first processing pipeline 108 and the second processing pipeline 110 represent two distinct components. For instance, the two processing pipelines (108, 110) can represent two instances of functionality implemented by one or more hardware processor devices running machine-readable instructions, and/or by other hardware logic components. In that context, the two processing pipelines (108, 110) can operate in parallel and/or in succession. In another implementation, the two processing pipelines (108, 110) represent a single component. In that context, the first processing pipeline 108 represents the single component when it is assigned the task of processing brand names, while the second processing pipeline represents the single component when it is assigned the task of processing product names. Here, the two processing pipelines (108, 110) operate temporally, that is, one after the other.

Finally, note that the graph creation system 104 shows only two processing pipelines (108, 110). But the graph creation system 104 can host any number of processing pipelines that operate in parallel and/or in temporal succession. For example, a third processing pipeline (not shown) can produce C3 nodes associated with a third category, such as product function. That category represents different functions that can be performed by products. The graph creation system 104 can produce edges between any two nodes associated with different subject matter categories. This capability allows the graph creation system 104 to overall produce a knowledge graph having any level of informational complexity, that is, by establishing links between pairings of names with respect to any number of categories (potentially including more than two categories). The application system(s) 106 can leverage such a knowledge graph to perform machine-implemented reasoning. But to facilitate explanation, the following description will emphasize the representative task of establishing a bipartite graph associated with two types of nodes, where those types correspond to brands and products. As a further clarification, this disclosure will emphasize the case in which the graph creation system 104 establishes edges between names associated with different categories (such as brands and products). But the graph creation system 104 can also establish links between names within a single category, such as between individual brand names, and/or between individual product names.

Each processing pipeline processes names in three main stages: generation; verification; and augmentation. That is, both the first processing pipeline 108 and the second processing pipeline 110 include the same three core phases. But the processing pipelines (108, 110) may implement the three phases in different ways, and with respect to different sources of input information.

First consider the operation of the first processing pipeline 108. A generation component 112 of the first processing pipeline 108 generates a set of seed brand names from one or more information sources, referred to herein as seed sources. Each seed brand name corresponds to a word-based n-gram that potentially refers to a brand, and has any number of tokens (e.g., words). For example, the generation component 112 can collect seed brand names corresponding to: MICROSOFT, MSFT, APPLE INC., IBM, AMAZON, etc. Subsection A.2 describes the generation component 112 in further detail.

A verification component 114 determines whether each seed brand name corresponds to an actual brand that has an established presence in an online community, such as the World Wide Web (WWW). Presence can be defined in any way. Generally, a brand name has presence in an online community when there is evidence that users engage in transactions in the online community that are directed to, or which otherwise concern, the brand name. In one example, for instance, the verification component 114 determines whether a particular seed brand name (e.g., ACME CORP.) is associated with an established web site or sites, such as the official website AcmeFoods.com. Here, the mere existence of such a domain in the online community suggests that there is activity in the online community directed to the brand name. The verification component 114 can eliminate or otherwise discount seed brand items that do not have a prescribed online presence. This operation yields a set of verified brand names. Subsection A.3 describes the verification component 114 in greater detail.

An augmentation component 116 expands each verified brand name into a group of related brand names. For example, the augmentation component 116 expands a verified brand name for "MICROSOFT" to include the related brand names "MICROSOFT CORP.," "MSFT," "MICROSOFT CORPORATION," "MS," etc. The augmentation component 116 performs this task using a query-click log. Overall, the augmentation component 116 produces a set of expanded brand names. The term "expanded brand name" refers to a cluster of related brand names. Subsection A.4 describes the augmentation component 116 in greater detail.

The second processing pipeline 110 includes a generation component 118 for generating a set of seed product names, a verification component 120 for producing a set of verified product names, and an augmentation component 122 for producing a set of expanded product names. Later subsections (below) will provide details on the aspects of the second processing pipeline 110 that are common to the first processing pipeline 108, and those aspects which are different.

A data store 124 stores the set of expanded C1 (brand) names and the set of expanded C2 (product) names. Each expanded brand name can be conceptualized as a node which represents a set of related brand names. Each expanded product name can similarly be construed as a node which represents a set of related product names.

An edge formation component 126 establishes connections between nodes in the data store 124 of different types (and, in some implementations, of the same type). That is, each such connection or link defines a relationship between a particular expanded brand name and a particular expanded product item. The edge formation component 126 generates the links by considering evidence provided by one or more sources of relationship-related information, described below. One such source provides document titles (e.g., ad titles). A document title that includes both a particular brand name and a particular product name constitutes evidence that the specified brand is related to the specified product. A document title that includes two brand names constitutes evidence that the two brand names may be related. Similarly, a document title that includes two product names constitutes evidence that the two product names may be related. Subsection A.5 describes the edge formation component 126 in greater detail.

The operation of the edge formation component 126 establishes a C1-to-C2 knowledge graph, which is stored in a data store 128. That is, as a minimum, the C1-to-C2 knowledge graph links C1 nodes (e.g., brand nodes) and C2 nodes (e.g., product nodes). As indicated above, each node is associated with a family of related names.

A post-processing component 130 can refine the C1-to-C2 knowledge graph over time in one or more respects. For instance, assume that the graph creation system 104 first generates an initial brand-to-product knowledge graph from "scratch" in the manner described above. The post-processing component 130 can refine the initial brand-to-product knowledge graph using different strategies. In this context, the graph creation system's generation of the initial brand-to-product knowledge graph may be regarded as a bootstrapping operation that establishes an initial set of nodes and edges. The post-processing component 130 can then successively refine these nodes and edges. Subsection A.6 describes the post-processing component 130 in greater detail.

A knowledgebase (KB) integration component 132 transfers the created C1-to-C2 knowledge graph to the application system(s) 106, for storage in a data store 134. More specifically, in one implementation, the data store 134 provides a knowledgebase that consists of only the C1-to-C2 knowledge graph. In another implementation, the data store 134 provides a knowledgebase that defines the relationships among nodes pertaining to additional subject matter categories, that is, beyond the subject matter categories of brands and products. In that case, the KB integration component 132 can perform the additional function of integrating the C1-to-C2 knowledge graph into other parts of the knowledgebase.

For instance, consider the illustrative case in which a preexisting knowledgebase already stores at least a product-to-function knowledge graph. That knowledge graph describes the relations between products and the functions performed by the products. For example, the preexisting knowledgebase may link a product name "hammer" with the function name "driving nails." The KB integration component 132 could integrate the brand-to-product knowledge graph (created by the edge formation component 126) into this preexisting knowledgebase by determining, for each new product node defined by the brand-to-product knowledge graph, whether a counterpart product node already exists in the knowledgebase. If so, the KB integration component 132 can merge the new and old product nodes, e.g., by forming a union of the terms associated with the new and old product nodes. If a preexisting node does not exist in the knowledgebase, the KB integration component 132 can add the new node to the knowledgebase. Further, the KB integration component 132 can add the new brand nodes defined by the brand-to-product knowledge graph, as well as the links between the product nodes and the brand nodes defined by the edge formation component 126.

Figure 2:
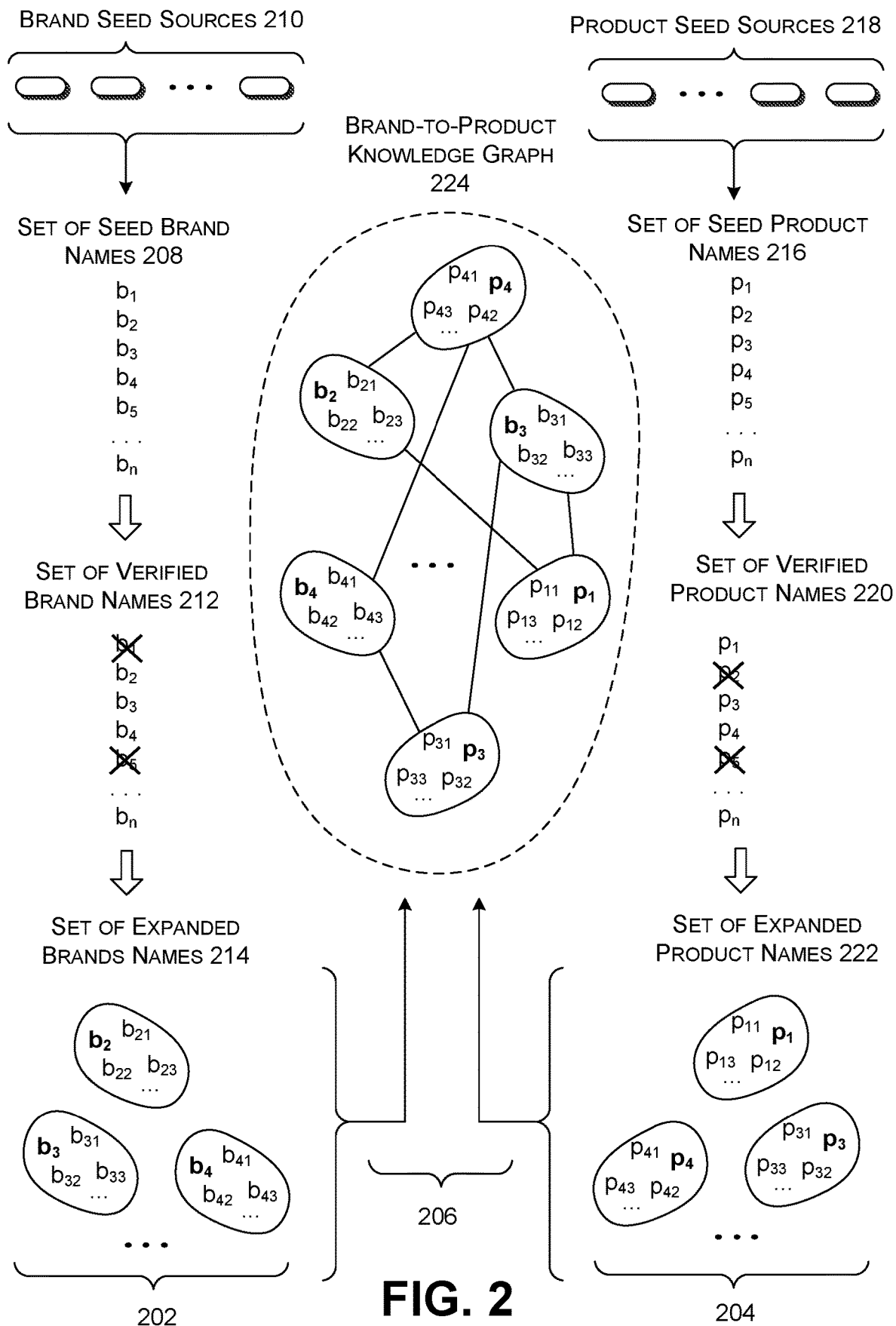
FIG. 2 shows an example of the operation of the graph creation system of FIG. 1.

Advancing momentarily to FIG. 2, this figure shows an example of the operation of the graph creation system 104 of FIG. 1. The processing in the leftmost column 202 represent operations performed by the first processing pipeline 108. The processing in the rightmost column 204 represent operations performed by the second processing pipeline 110. The processing in the middle column 206 represent operations performed by the edge formation component 126.

With respect to the leftmost column 202, the generation component 112 produces a final set of seed brand names 208 based on candidate brand names culled from one or more brand seed sources 210. The verification component 114 generates a set of verified brand names 212 based on the seed brand names 208, in response to verifying whether each seed brand name has a prescribed presence within an online community. The augmentation component 116 expands each verified brand name, to overall produce a set of expanded brand names 214.

Similarly, with reference to the rightmost column 204, the generation component 118 produces a final set of seed product names 216 based on candidate product names culled from one or more product seed sources 218. The verification component 120 generates a set of verified product names 220 based on the seed product names 216, in response to verifying whether each seed product name has a prescribed presence within an online community. The augmentation component 122 expands each verified product name, to overall produce a set of expanded product names 222.

The edge formation component 126 operates on the set of expanded brand names 214 and the set of expanded product names 222 to produce a brand-to-product knowledge graph 224.

Returning to FIG. 1, this figure shows that the application system(s) 106 host at least an application system $A_1$ 136 and an application system $A_n$ 138. More generally, the application system(s) 106 can host any number of application systems, each of which can perform any service(s) to an end user. Each such service utilizes the information provided in the knowledgebase (stored in the data store 134). The following explanation will make reference to a generic application system, corresponding to either the application system $A_1$ 136 or the application system $A_n$ 138.

In one case, the application system leverages the knowledgebase to perform an information retrieval function. For instance, an application system can receive an input query from a user computing device 140, e.g., via a computer network of any type (e.g., the Internet), not shown. The input query can include at least one keyword. The application system can use the keyword as an input key to retrieve information from the knowledgebase.

The above-summarized transaction can be performed in different ways in different respective implementations. For example, assume that the user wishes to find all products associated with the brand "MICROSOFT." The user may formulate an input query that expresses that request in any environment-specific manner. For example, the user may formulate a structured input query that specifies "Find products for brand=MICROSOFT." Or the user may enter his or her request as free-form text, and rely on the application system to use known natural language understanding techniques to interpret it. In response to the user's input query, the application system can map the keyword "MICROSOFT" to the brand node in the knowledgebase associated with this name, and then extract product names (associated with respective product nodes) that are linked to this brand node. The application system can then return an answer to the user computing device that expresses the thus-determined set of products.

Alternatively, assume that the user creates an input query that specifies a request to find brands related to the product "smartphone." In response to such a query, the application system can map the keyword "smartphone" to the product node in the knowledgebase associated with this name, and then extract brand names (associated with respective brand nodes) that are linked to this product node. One such brand name could be "APPLE," for instance. The application system can then return an answer to the user computing device 140 that expresses the thus-determined set of brands.

In still another case, the application system can use the knowledgebase to supplement the user's query with additional knowledge. For example, assume that a knowledgebase contains at least nodes pertaining to U.S. states, together with nodes pertaining to notable people who originate from those states. The application system can process an input query that reads "senators from Texas" by first using the knowledgebase to identify the names of senators who have represented the state of Texas, e.g., by finding a Texas node and then identifying senators who are linked to the Texas node. The application system can then expand the user's initial input query to include the identified names. The application system can then perform a search within a corpus of documents based on the expanded input query.

In a related case, the application system can leverage the knowledgebase to interpret the meaning of the user's input query. For example, consider the case in which a knowledge links states to their respective counties. The application system can process an input query that reads "industries in Loving, Tex." by first using the knowledgebase to determine that "Loving" likely refers to a county in the State of Texas. The application system bases its conclusion on the fact that there is a "Loving" node linked to a "Texas" node in the knowledgebase. The application system can then add metadata to the input query which reflects this insight. The application system can then perform a search based on the enhanced input query. Or the application system can leverage the knowledgebase to answer the input query, assuming the knowledgebase also includes jurisdiction-to-industry information.

In another case, an application system can leverage the knowledgebase to serve a digital ad to the user. For example, assume that the knowledgebase links product names to product functions. Further assume that the user inputs the query "PLAYSTATION." The application system can use the knowledgebase to determine that PLAYSTATION is associated with a game console node, indicating that it performs a computer gaming function. It can then identify other game consoles made by other manufacturers that are linked to the game console node. The application system can then serve one or more ads to the user pertaining to a variety game consoles produced by different manufacturers.

In another case, an application system can use known artificial intelligence techniques to reason about an input query with the aid of the knowledgebase. For instance, the application system can use known techniques to answer the query, "What mountains are more than 5,000 feet tall within 200 miles of Seattle."

The above-described application systems are described by way of illustration, not limitation. Other computing environments can leverage a knowledgebase in other ways.

Figure 3:
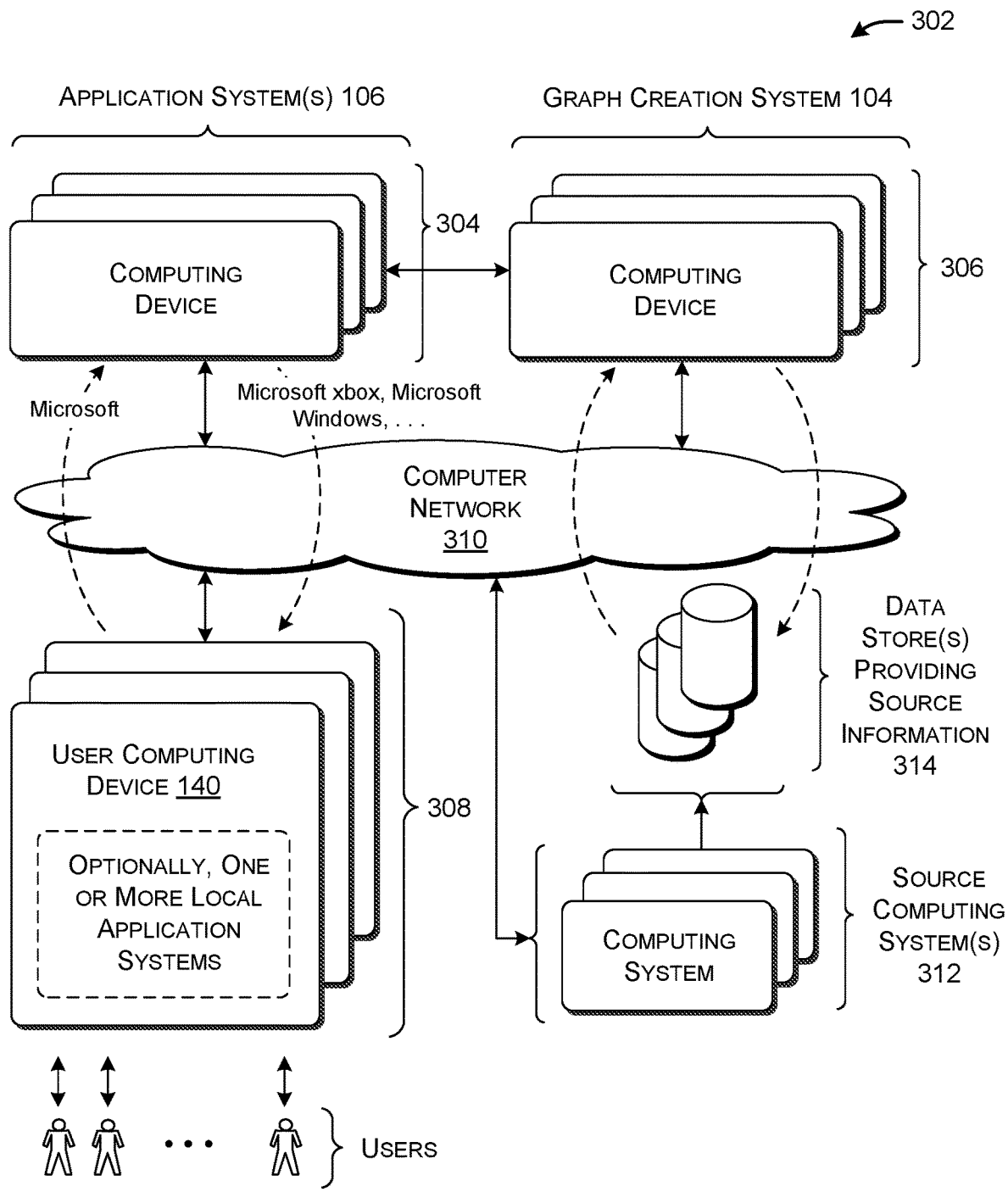
FIG. 3 shows illustrative computing equipment for implementing the system environment of FIG. 1.

FIG. 3 shows illustrative computing equipment 302 for implementing the computing environment 102 of FIG. 1. In one implementation, the computing equipment 302 can include one or more computing devices 304 (e.g., servers) that implement the application system(s) 106, and one or more computing devices 306 that implement the graph creation system 104. In other implementations, a common set of computing resources can implement one or more functions of the graph creation system 104 and the application system(s) 106.

The computing device(s) 306 that implement the graph creation system 104 can update the brand-to-product knowledge graph on any basis, e.g., a periodic basis, a demand-driven basis, etc. Upon each update, the graph creation system 104 can transfer the updated brand-to-product knowledge graph to the computing device(s) 304 that implement the application system(s) 106.

A plurality of user computing devices 308 interact with the computing device(s) 304 of the application system(s) 106 via a computer network 310. Any user computing device can correspond to, without limitation, any of: a desktop computing device; a laptop computing device; a smartphone; a tablet-type computing device; a set-top box; a game console; a virtual/augmented reality device; a wearable computing device, and so on. One illustrative user computing device corresponds to a user computing device 140 which was introduced in the context of FIG. 1. Any user computing device can interact with an application system via a browser program. The computer network 310 can correspond to a wide area network (e.g., the Internet), a local area network, one or more point-to-point links, etc.

Alternatively, any application system can be entirely hosted by a local user computing device. Alternatively, any application system can be hosted in distributed fashion, e.g., by allocating one or more application functions to a remote server and one or more application functions to a local user computing device.

One or more source systems 312 provide source information which can be mined by the graph creation system 104. The source systems 312 store the source information in one or more data stores 314. For example, a search engine may correspond to one source system that provides a query-click log. As will be described, parts of the edge formation component 126 rely on this query-click log to perform its functions.

In summary to Subsection A.1, the graph creation system 104 has various technical characteristics which enable it to generate a knowledge graph of any complexity in an efficient manner. For example, the graph creation system 104 does not primarily rely on the use of machine-training to generate a knowledge graph, and is therefore more efficient than a traditional machine-training solution. More specifically, a machine-training strategy involves (in the case of supervised learning) a burdensome, time-consuming, and expensive task of manually labeling training examples to produce a training set. A machine-training strategy also typically involves a time-consuming and resource-hungry process of learning parameter values based on the training set. Because the graph creation system 104 does not primarily rely on machine learning, it does not suffer from these problems. More explicitly stated, the graph creation system 104 can produce the C1-to-C2 knowledge graph in less time and with less financial cost than some machine-learning solutions, and by using less processing and memory resources compared to some machine-learning solutions.

Further, the graph creation system 104 generates a knowledge graph using an explicit flow of operations. Each operation depends on the execution of a discrete set of rules that defines an explicit processing strategy. By contrast, a traditional machine-trained model relies on a single collection of weight values to perform its operations. Due to this technical difference, a developer can more readily troubleshoot the operation of the graph creation system 104 when it produces unsatisfactory results, compared to the case of a machine-trained model. In other words, the graph creation system 104 transparently exposes its operating logic for the inspection of the developer. This allows the developer to detect the cause of a problem. Moreover, the graph creation system 104 enables a user to make piecemeal changes to its operation by selectively changing the component that is producing substandard results. In contrast, a machine-trained model constitutes an opaque "black box" collectively defined by its set of parameter values. A developer typically cannot trace performance-related issues to a part of the system. This forces the user to address an observed problem by retraining the entire model, which is a labor-intensive, expensive, time-consuming, and resource-intensive task. And even if this effort solves the observed problem, the developer may gain no insight as to the underlying cause of the problem.

Further, the graph creation system 104 applies a technique for creating a knowledge graph that is applicable to any subject matter domain(s). In contrast, some machine-learning strategies produce a model that is only applicable to the subject matter domain(s) associated with its training set. A developer who wishes to apply the model to another domain may be forced to generate a new training data set for that domain and retrain the entire model.

Another factor that contributes to the general-purpose nature of the graph creation system 104 pertains to the kind of evidence that it uses to generate the knowledge graph. The graph creation system 104 relies on information that is primarily (or entirely) independent of the internal records maintained by ecommerce websites. In contrast, a company which sells a collection of products to users may attempt to identify relations among products by mining its internal records regarding the purchase and/or browsing activity of users that visit its website. Such a solution may have limited application when applied outside of the company's business space.

As a point of clarification, the above description says that the graph creation system 104 does not primarily rely on machine learning. In some cases, however, the graph creation system 104 may optionally rely on one or more machine-trained models to perform one or more support-related tasks associated with its operation. For example, the graph creation system 104 may rely on weight values that describe the respective relevancies of different sources of name information for a subject matter topic under consideration (e.g., brands or products). A machine-trained model can be used to compute those weights. Alternatively, or in addition, a developer can manually choose those weights. If used, machine-training in these limited kinds of contexts does not negate the advantages described above because it serves only a narrow role in the overall flow of operation, and, furthermore, is optional. Further, the machine-trained models used to perform these support tasks may be relatively stable over time, and may therefore require retraining/updating on a relatively infrequent basis.

A.2. The Generation Component

Figure 4:
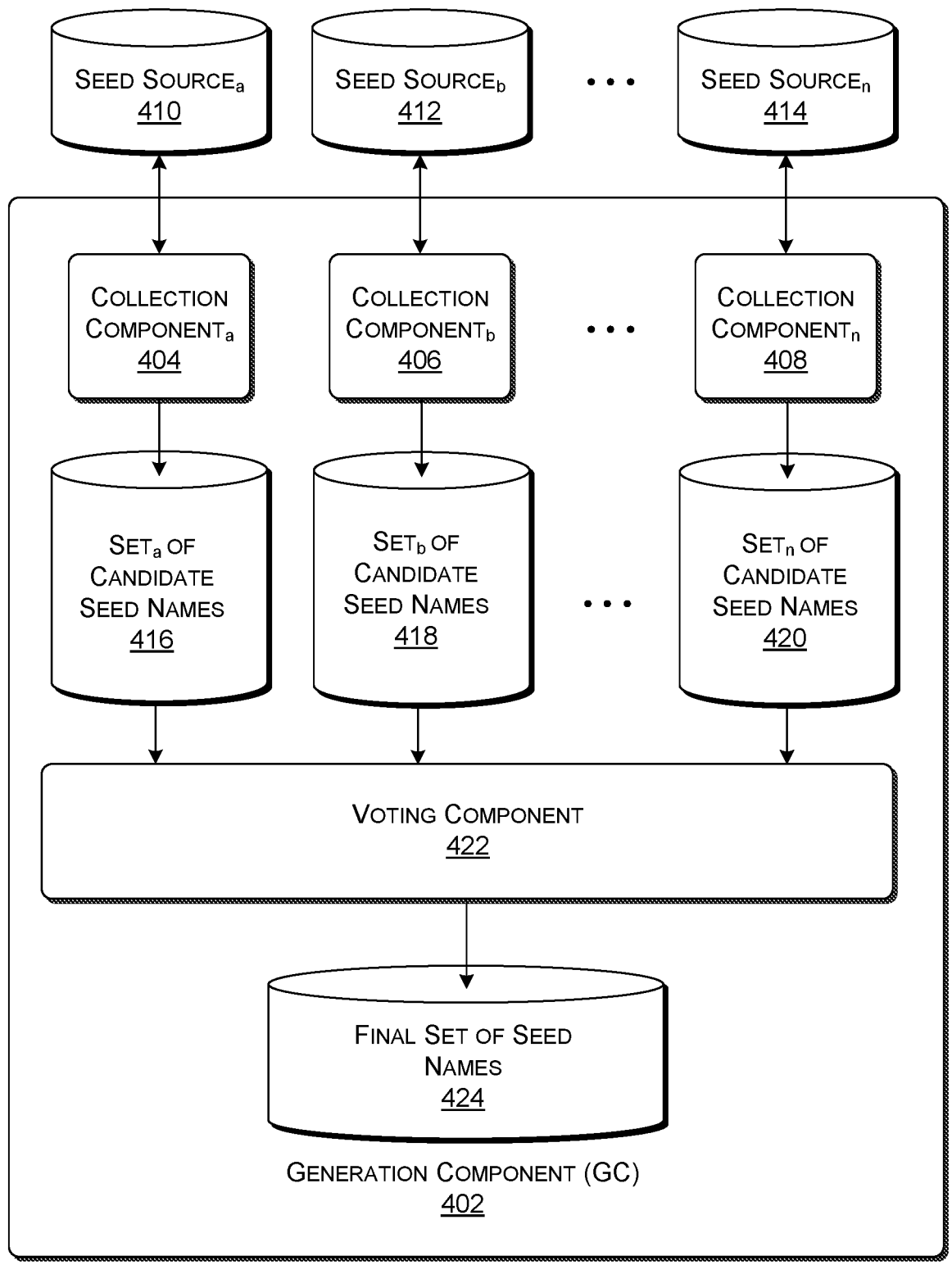
FIG. 4 shows one implementation of a generation component, which is one type of component used by the graph creation system of FIG. 1.

FIG. 4 shows one implementation of a generation component 402, corresponding to a generalized depiction that applies to either the generation component 112 used by the first processing pipeline 108 or the generation component 118 used by the second processing pipeline 110. The following explanation will begin by describing the pipeline-independent aspects of the operation of the generation component 402; these are aspects that are performed regardless of its implementation in the first processing pipeline 108 or the second processing pipeline 110. The explanation will then provide additional details regarding the operation of the generation component 402 in the context of its pipeline-specific uses. To further facilitate explanation, the description will continue by describing C1 and C2 in terms of brands and products.

The generation component 402 includes one or more collection components (404, 406, . . . , 408) for culling candidate seed names (henceforth, simply "candidate names") from one or more seed sources, as provided in one or more corresponding data stores (410, 412, . . . , 414). The collection components (404, 406, . . . , 408) store respective sets of candidate names in data stores (416, 418, . . . , 420). Each collection component can use a push-based technique, a pull-based technique, or some combination thereof to extract candidate names from the seed sources. In a pull-based technique, a collection component sends a request to a corresponding seed source, upon which the seed source returns seed names. In a push-based technique, a seed-source independently sends seed names to the collection component. The collection component may register to receive push-based updates using any kind of subscription strategy.

In some implementations, each collection component can also store timestamp information that describes a degree of temporal currency of each candidate name. For instance, a collection component can store a timestamp associated with each candidate name. In some implementations, each collection component can also store frequency information that describes a number of times that a candidate name appears within a corresponding seed source.

A voting component 422 uses an environment-specific algorithm or model to select a final set of seed names from the separate sets in the data stores (416, 418, . . . , 420). The voting component 422 stores the final set of seed names in a data store 424. More generally, each seed source provides evidence as to candidate names that should be included in the final set of seed names. The voting component 422 uses an environment-specific data fusion strategy to choose the final set of seed names from among the different sets of candidate names.

Figures 5, 6:
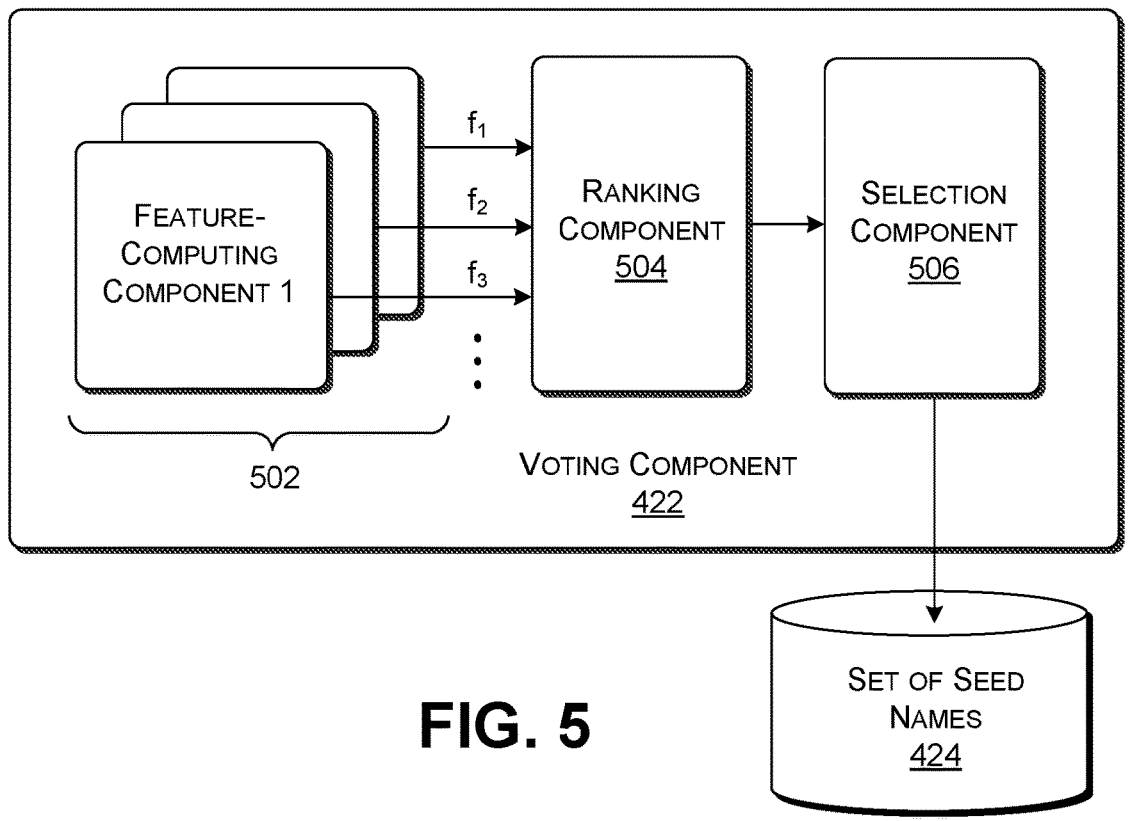
FIG. 5 shows one implementation of a voting component, which is one component of the generation component of FIG. 4.
FIG. 6 shows an example of the operation of the voting component of FIG. 5.

FIG. 5 shows one implementation of the voting component 422. The voting component 422 includes one or more feature-computing components 502 for calculating respective feature values for a candidate name under consideration. As will be described below, the first processing pipeline 108 leverages a different set of features compared to the second processing pipeline 110. An optional ranking component 504 determines an overall ranking score for a candidate name based on the feature values. In one case, the ranking component 504 applies one or more discrete rules to assign a ranking score to each name under consideration. In another case, the ranking component 504 uses a machine-trained model to perform this task. A selection component 506 makes a final determination of whether to retain a candidate name based on its ranking score, or, if the ranking component 504 is not used, based on one or more feature values. For example, the selection component 506 can store a candidate name if its ranking score is above an environment-specific threshold value.

Brands

Now consider the application of the generation component 402 to the generation of a set of seed brand names. In this context, at least some of the seed sources correspond to preexisting knowledge resources, each of which explicitly identifies at least some text items as being brand names. For example, such a seed source can identify a name as a brand name by attaching metadata to it that identifies it as a brand name, or by storing it in a brand-specific field of a data structure, etc. In still other cases, the seed source may itself constitute a list of brand names. Without limitation, illustrative preexisting knowledge resources that may contain brand names include: lists that are internal to an enterprise which hosts the computing environment 102; online encyclopedia resources (such as Wikipedia or the like); databases used by personal digital assistant systems (such as the SIRI system provided by Apple Inc. of Cupertino, Calif.); ecommerce websites (such as Amazon.com), and so on. One or more brand-mining collection components can harvest brand names from such respective seed sources using a push-based technique, a pull-based technique, or combination thereof. Note that, while each seed source stores information regarding candidate brand names, an individual seed source's data store is likely to have a restricted source-specific scope, and is therefore unlikely to include a comprehensive universe of brand names.

Any brand-mining collection component can also store timestamp information that specifies when a corresponding seed source created a brand name under consideration, or, if that information is not available, when the brand-mining collection component first encountered the brand name in the seed source.

Now referring to the voting component 422, a vote-based feature-computing component determines a number or ratio of seed sources in which a candidate name appears. For instance, consider the brand name "APPLE INC." The vote-based feature-computing component can determine a number of seed sources in which that brand name is found, divided by a total number of seed sources that have been polled. For example, if there are five contributing seed sources, the vote-based feature-computing component can determine that "APPLE INC." is present in three of the five seed sources. The selection component 506 can then select the brand name if this ratio exceeds an environment-specific threshold, such as 50%. For instance, the selection component 506 would select the candidate brand name "MSFT" if that name appeared in three of five seed sources, because that ratio exceeds 50%. (In this example, the voting component 422 can omit use of the ranking component 504.)

In some implementations, the generation component 402 can also take into consideration the value of a seed source in providing reliable brand names. For instance, the generation component 402 can assign a relevance-based weight value to each seed source as a whole. The vote-based feature-generating component can then discount (or promote) the contribution of each seed source based on its relevance-based weight value. For example, assume that a particular seed source includes a brand name under consideration. But also assume that this particular seed source has a relatively low reliability for providing accurate brand-related information, e.g., as reflected by a relevance-based weight value for this seed source of 0.75 (for example). The vote-based feature-computing component can discount the contribution of this seed source (corresponding to a vote of 1.0) by multiplying it by 0.75. In one implementation, a developer can manually define the relevance-based weight values. Alternatively, or in addition, a machine-trained model can be used to provide the relevance-based weight values.

In some implementations, the vote-based feature-computing component can also assign a time-based weight value to each brand name under consideration based on the temporal currency associated with the brand name, which, in turn, is based on the timestamp information provided by the collection components (404, 406, . . . , 408). A relatively high time-based weight value indicates that there is current activity within an online community pertaining to the brand name. A relatively low time-based weight value indicates that interest in the brand name has waned. For example, the vote-based feature-computing component may assign a higher weight to the brand name "MICROSOFT" compared to "NETSCAPE"; this is because the name "MICROSOFT" is in current use, while "NETSCAPE" is not.

In one implementation, the vote-based feature-computing component can compute a time-based histogram of the timestamp information associated with a brand name under consideration. The vote-based feature-computing component can then select a time-based weight value that describes the histogram, e.g., by choosing a first time-based weight value for a name that is trending down and a second time-based weight value for a name that is trending up, etc. The vote-based feature-computing component can perform this operation based on all of the evidence collected by all of the collection components (404, 406, . . . , 408), or separately, for the evidence collected by each collection component.

The vote-based feature-computing component can take the time-based weight value of a brand name into account in different ways. Consider the scenario in which the time-based weight value reflects the overall temporal currency of a brand name, rather than a source-specific measure. In one implementation, the vote-based feature-computing component can completely exclude a candidate name that is not sufficiently current, as defined by any environment-specific threshold value. In another case, the vote-based feature-computing component can discount or promote a vote associated with a particular brand name under consideration based on the time-based weight value. For example, the vote-based feature-computing component can multiply the final vote value by the time-based weight value. Alternatively, the vote-based feature-computing component can perform this offsetting operation on a source-by-source basis.

Products

Now consider the application of the generation component 402 to the generation of a set of seed product names. One product-mining collection component can generate a set of candidate product-related names by culling queries from a query log provided by a search engine. That collection component can then produce a vector representation of each query using known techniques, e.g., by representing the query as one or more one-hot word vectors, one or more letter-based n-gram vectors, etc. The collection component can then use a machine-trained model to map that vector representation of the query to a score. That score reflects a probability that the query describes a product. For example, assume that one of the queries in the query log reads, "Investment window of opportunity." The machine-trained model would assign a score to this query which indicates that it is unlikely to correspond to a product, whereas a query that included the term "WINDOWS 10" would receive a high score.

Another product-mining collection component can cull seed product names from a browser-related log. More specifically, a company that provides a browser application may maintain such a browser-related log in its servers. For example, Google, Inc. of Mountain View, Calif. may maintain such a log associated with its CHROME browser program. In part, the browser-related log may describe the anonymized behavior of users in the course of using the browser program to interact with various websites. In one example, a collection component can extract URL-related information from such a log regarding queries that users have submitted to an identified group of ecommerce websites, such as Amazon.com. For instance, the collection component can extract a candidate product name from a URL that indicates that at least one user visited a website and entered a search pertaining to "mock turtlenecks." The presumption that underlies the collection of this kind of data is that a user who submits a search to an ecommerce site is commonly attempting to find a particular product, and is thus attempting to specify the product in his or her query.

A yet other type of product-mining collection component (referred to below as an "ad-mining" collection component) can extract titles associated with a database of ad offers. That collection component can then decompose each title into its constituent n-grams. For example, consider the illustrative case in which an ad title reads, "Mock turtleneck pullover by Acme Corp., back to school sale." Each such component n-gram constitutes a potential product name. For n=3, the collection component can decompose the title into its unique word-based trigrams (three-word sequences in the title), bigrams (two-word sequences), and unigrams (single word tokens). For example, the collection component will identify the following three-word sequences: "Mock Turtleneck pullover," "turtleneck pullover by," "pullover by Acme," etc. The collection component will similarly identify all of the bigrams (e.g., "Mock turtleneck," "Turtleneck pullover," etc.), and unigrams (e.g., "Mock," "pullover," etc.). The collection component can optionally remove n-grams that either begin with a stop word (e.g., the word "the") or end with a stop word.

Any product-mining collection component can also count the number of times that each unique n-gram appears in a seed source. For example, an ad-mining collection component can determine that the term "pullover" appears in over 10,000 ads. An ad-mining collection component can also identify a category associated with each n-gram that appears in an offer title. In one case, an ad can include metadata that describes a category of products or services to which the ad pertains. The ad-mining collection component can consider each n-gram that originates from a title as corresponding to the category of the title as a whole. For example, if the above-described turtleneck pullover ad has a title that is tagged as pertaining to clothing, then all its constituent n-grams are similarly marked as pertaining to clothing.

Any product-mining component can also store timestamp information that specifies the timing of online activity pertaining to a product name under consideration. For instance, a product-mining collection component can store timestamp information associated with each query that contains a product name under consideration, indicating when a user submitted that query to a search system. Another product-mining collection component can store timestamp information associated with each ad title that contains a product name under consideration; that timestamp information may identify a time at which an advertiser created the ad. A product-mining collection component can also store timestamp information associated with each occasion in which an ad containing a product name was served to an end user, etc.

Now referring to the voting component 422, a vote-based feature-computing component provides a vote value in the same manner described above for brands. For example, the vote-based feature-computing component can count a number of seed sources that include a product name under consideration. The vote-based feature-computing component can then divide that number of seed sources by a total number of seed sources that have been canvased.

The vote-based feature-computing component can incorporate the influence of a relevance-based weight value and/or a time-based weight value in the same manner described above with respect to the case of brand names. The relevance-based weight value takes into consideration the reliability of a seed source that contains a product name under consideration. The time-based weight value takes into consideration the temporal currency of the evidence provided by a particular seed source, or all of the seed sources in aggregate. Alternatively, the collection of feature-computing components 502 can include a separate relevance-based feature-computing component that provides a relevance-based weight value, and/or a separate time-based feature-computing component that computes a time-based weight value. The ranking component 504 then operates on all of these raw feature values.

A frequency-based feature-computing component can determine or receive a count value that reflects a total number of times that a given name appears in each given seed source. For instance, the frequency-based feature-computing component can determine that HOLOLENS occurs over 10,000 times in a database associated with a particular seed source. The frequency-based feature-computing component can then compute a frequency value that is equal to the log of this number of occurrences.

An entropy-based feature-computing component can collect evidence as to a level of variation in contexts in which a candidate product name is used. For instance, consider the product name "cord." The seed sources may reveal that this term appears in many different contexts, such as in the context of electrical cabling, clothing, hiking equipment, construction equipment, etc. By contrast, the term "computer power cord" may be exclusively used in the domain of electronic equipment. Hence, the entropy-based feature-computing component would assign a higher entropy weight to "cord" compared to "computer power cord."

The entropy-based feature-computing component can determine the context in which a candidate item is used in different ways. In one case, the entropy-based feature computing component can identify the category associated with a product name based on the category associated with the ad title in which it appears. In another case, the entropy-based feature-computing component can determine context information using a machine-trained model that is developed for this task.

The ranking component 504 can discount a candidate product name as a positive function of its level of variation in use (as reflected by the entropy-based weight value for this name). This means that a product name that appears in many different contexts will have a lower score than a product name that appears in fewer contexts. This operation is predicated on the assumption that a name that is used in many different contexts may have uncertain relevance to a current target context.

A part-of-speech (POS)-based feature-computing component can assign a score to a candidate name based on the part-of-speech associated with the candidate name and/or based on a part-of-speech analysis of a context in which the candidate name appears in a document provided by a seed source. In one implementation, the POS-based feature-computing component can perform this task by using known techniques to determine the part-of-speech pattern associated with a candidate name under consideration. The POS-based feature-computing component can then consult a lookup table to identify a POS weight value associated with that pattern. For instance, the POS-based feature-computing component will determine that the candidate name "New York" matches a part-of-speech pattern corresponding to "adjective+noun," meaning that the name is composed of an adjective followed by a noun. The lookup table may indicate that this name has a more favorable weight than either "New" or "York" considered as separate respective names. A machine-trained model and/or a human developer can assign weight values to different respective patterns.

A dictionary-based feature-computing component can determine whether a product name under consideration includes one or more tokens that are present in a favored (positive) word set and/or a disfavored (negative) word set. The dictionary-based feature-computing component can assign a discounting or promoting factor to the product name depending on the results of this lookup operation. For example, the dictionary-based feature-computing component can generate a promoting factor that operates to boost the relevance of a name that includes the word "model" or the word "part," etc. On the other hand, the dictionary-based feature-computing component can assign a discounting factor that operates to discount a name that contains the word "review" or the word "cheap," etc. This discounting behavior is based on the assumption that any name that includes these words is not primarily aiming at describing a brand or product, but is instead offering a judgment regarding that brand or product; therefore, such a name is poor candidate for use in generating the knowledge graph.

Having computed the above-identified feature values, the ranking component 504 can compute an overall ranking score for a candidate name under consideration, based on some or all of the feature values. In one example, the ranking component 504 can perform this task based on a machine-trained ranking model, such as a model that computes a score as a weighted sum of feature values, where the weights are learned in a machine-learning process. The selection component 506 can retain the candidate name if its ranking score is above an environment-specific threshold value.

FIG. 6 shows an example of the operation of the generation component 402 in the context of the generation of a set of product names. A first table 602 identifies whether each name is found in three different seed sources. For example, two seed sources contain the n-gram "APPLE WATCH," while one seed source does not.

A second table 604 identifies a vote value that is derived from the data in the first table 602. For example, the second table 604 indicates that the name "APPLE WATCH" has a vote value of 0.66 because two-thirds of the seed sources contain this term. The second table 604 also identifies a frequency value $f_{ij}$ associated with each seed source i, corresponding to the log of the number of times $c_{ij}$ that a product name under consideration j (e.g., "APPLE WATCH") appears in that seed source. That is, the frequency value $f_{ij}$ is log($c_{ij}$). The second table 604 also provides an overall frequency-based weight value w which is equal to the sum of the frequency values for a name under consideration. In one non-limiting example, the ranking component 504 uses a machine-trained ranking model to assign a ranking score to the candidate name, based on at least its vote value, frequency value, entropy value (not shown in FIG. 5), etc. For example, the ranking model may correspond to a linear classifier which assigns a ranking score based on a weighted sum of the different feature values. An offline training process can compute the parameter values that are used in that weighted sum.

Note that this subsection set forth a different set of features/techniques for use in the generation component 112 of the first processing pipeline 108 compared to the generation component 118 of the second processing pipeline 110. More generally, however, also note that any feature/technique that was described as being used in the second processing pipeline 110 can be applied to the first processing pipeline 108, and vice versa.

A.3. The Verification Component

Figure 7:
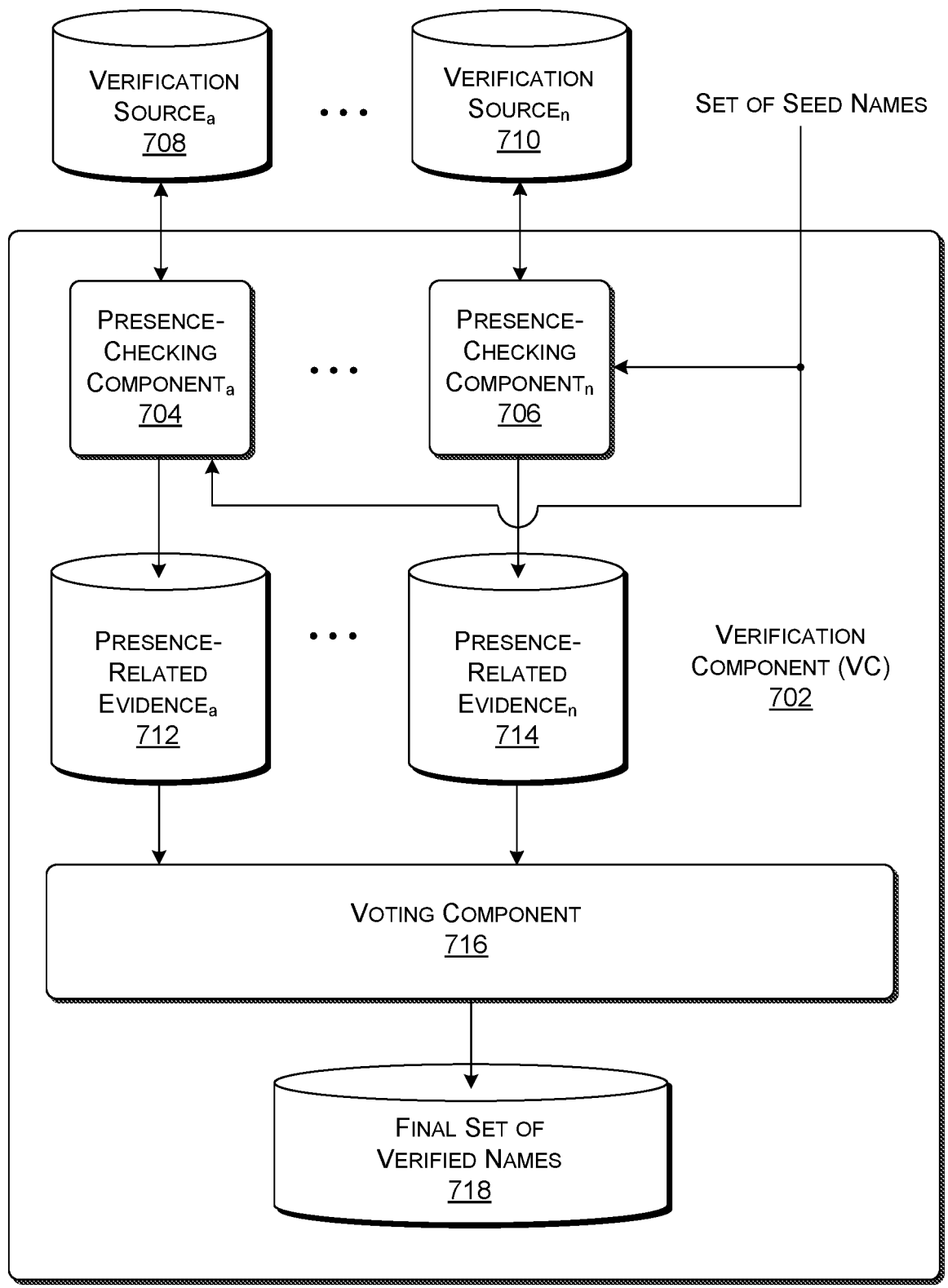
FIG. 7 shows one implementation of a verification component, which is another type of component used by the graph creation system of FIG. 1.

FIG. 7 shows one implementation of a verification component 702. The verification component 702 checks a seed name identified by the generation component 402 (of FIG. 4) to determine whether there is evidence that this name is the subject of activity in an online community. In the context of the processing of brand names, the verification component 702 of FIG. 7 corresponds to the verification component 114 of FIG. 1. In the context of the processing of product names, the verification component 702 corresponds to the verification component 120 of FIG. 1. As in the previous subsection, the verification component 702 will first be described in a pipeline-independent manner, and then described in the particularized contexts of its processing of brand names and product names.

The verification component 702 includes one or more presence-checking components (704, . . . , 706) for examining plural respective verification sources associated with respective data stores (708, . . . , 710). The presence-checking components (704, . . . , 706) store evidence in data stores (712, . . . , 714) based on the results of their presence-related determinations. For example, the first presence-checking component 704 will examine information in a data store 708 to determine whether that data store 708 indicates that a name under consideration has a prescribed online presence. If so, the presence-checking component 704 will store metadata in a data store 712 that reflects this conclusion.

A voting component 716 can provide a score for each name based on the verification results provided by the individual presence checking components (704, . . . , 706). For example, the voting component 716 can provide a vote value for a name under consideration that reflects a number or ratio of verification sources that support the conclusion that a name has a prescribed online presence. The voting component 716 can select a candidate name when the score is above a prescribed environment-specific threshold value. The voting component 716 can also consider other factors in determining the presence-based status of a name under consideration, such as frequency-based weight value, a time-based weight value, etc. Overall, the verification component 702 has the effect of excluding names that correspond to non-existent or obscure names, or, more generally, names for which users within an online community have not expressed a requisite amount of interest.

A data store 718 stores a complete set of names which meet the verification test. These names are qualified as being "verified" at this stage because they have passed the verification test.

Brands

In the case of a brand name, one type of presence-checking component can query the World Wide Web to determine whether the brand name is associated with any established websites. For example, this kind of presence-checking component will discover that the candidate brand name (MICRSOFT CORP) is associated with at least one official website (e.g., "Microsoft.com") affiliated with Microsoft Corporation of Redmond, Wash. Another type of presence-checking component can determine whether a name under consideration is associated with one or more social network pages. For example, this kind of presence-checking component will discover that the brand name (MICROSOFT CORP) is associated with a FACEBOOK page dedicated to Microsoft Corporation (e.g., "Facebook.com/Microsoft"). The voting component 716 can determine that a name under consideration satisfies a prescribed brand-related verification test if a prescribed number or ratio of verification sources agree that the name (e.g., MICROSOFT CORP) has an online presence.

Products

In the case of a product name, one kind of presence-checking component can determine whether one or more ecommerce-related sites devote a page (or other online resource) to a product name under consideration. Amazon.com, for instance, corresponds to one such ecommerce site that maintains pages associated with various products. Another kind of presence-checking component investigates a query log provided by a search engine to determine whether the product name appears as a component of a query, and, if so, the number of queries that contain this term. The voting component 716 can then use any environment-specific rule to determine whether the name has a prescribed presence based on the input factors. For example, the voting component 716 can determine that a product name has an online presence if: (1) it appears in at least one online catalog; and (2) it appears in a prescribed number of queries in a search engine's query log. In another implementation, the voting component 716 can determine that a name has an online presence if either factor (1) or factor (2) is met.

More generally, the above product-verifying strategy is based on the premise that a website that is specifically dedicated to a product may not exist. Hence, the verification component 702 examines other evidence that indicates that users are performing transactions (e.g., inquiries) in an online community that are directed to a particular product.

A.4. The Augmentation Component

Figure 8:
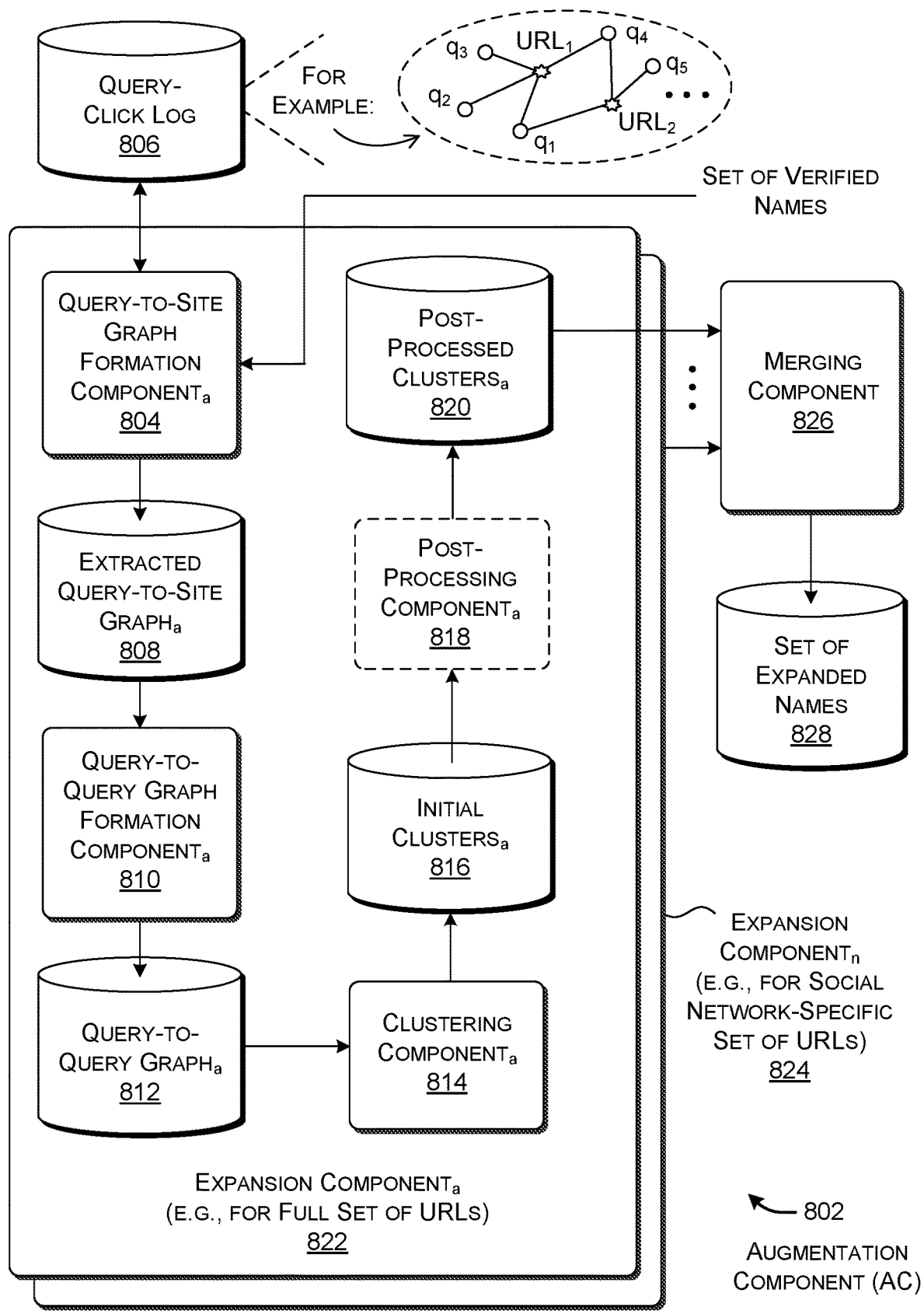
FIG. 8 shows one implementation of an augmentation component, which is another type of component used by the graph creation system of FIG. 1.

FIG. 8 shows one implementation of an augmentation component 802. The purpose of the augmentation component 802 is to expand each verified name into a group of related names. The augmentation component 116 of FIG. 1 corresponds to a brand-related instantiation of the augmentation component 802 of FIG. 8, while the augmentation component 122 of FIG. 1 is a product-related instantiation of the augmentation component 802. In one implementation, both the brand-related and product-related instantiations of the augmentation component 802 have the same behavior. Hence, the following description will describe the operation of the augmentation component 802 with reference to names in general, with the understanding that the names can correspond to either brand names or product names.

A query-to-site (Q-to-S) graph formation component 804 can extract data from a query-click log (in a data store 806) that pertains to a set of names under consideration. A search engine maintains the query-click log. In one implementation, the Q-to-S graph formation component 804 extracts information regarding all of the queries that users have submitted to the search engine within a prescribed timeframe (e.g., the last n months), together with information regarding URLs that the users have clicked on (or otherwise expressed interest in) in response to submitting those queries. For example, consider the brand name "MSFT." The Q-to-S graph formation component 804 extracts information from the query-click log that identifies all of the web pages that users clicked on in direct response to submitting a query including the term "MSFT." One such page may correspond to an official website sponsored by Microsoft Corporation. In response to the above-described operation, the Q-to-S graph formation component 804 stores a bipartite graph associated with the extracted data in a data store 808. That graph is referred to in FIG. 8 as a query-to-site (Q-to-S) graph.

In another implementation, the Q-to-S graph formation component 804 can perform a filtering operation to avoid collecting queries (and associated clicked URLs) which are not germane to a category under consideration. These ignored queries and URLs likely represent noise. The Q-to-S graph formation component 804 can use a machine-trained model and/or one or more discrete rules to perform this optional filtering operation. For example, assume that the target category under consideration is brands. The Q-to-S graph formation component 804 can apply a machine-trained model and/or discrete rule(s) to determine whether a query under consideration pertains to brand-related subject matter, e.g., as opposed a weather-related topic, a political-related topic, etc. The Q-to-S graph formation component 804 can avoid collecting a query and its associated clicked URLs if the query has a low likelihood of referring to a brand name. In another implementation, the Q-to-S graph formation component 804 operates by only extracting queries that include a brand name specified in the set of verified brand names, along with the URLs associated with those queries.

In another implementation, the augmentation component 802 entirely eliminates the use of the Q-to-S graph formation component 804. For example, assume that the query-click log already maintains a Q-to-S graph in a suitable form for processing by the augmentation component 802. In that case, the augmentation component 802 can operate directly on the Q-to-S graph stored in the data store 806.

A query-to-query (Q-to-Q) graph formation component 810 generates a similarity value that reflects a level of similarity between each pairing of queries in the Q-to-S graph. In one case, the Q-to-Q graph formation component 810 performs this function by generating a vector representation for each query. That vector includes dimensions associated with different URLs, with each slot of the vector storing a value k that reflects the k number of times users have clicked on a particular URL associated with that slot. For example, assume that the query is "MSFT," and that one of the dimensions of the vector corresponds to an official homepage of Microsoft Corporation; in that case, the slot associated with that dimension will store the number of times that users clicked on the homepage after submitting a query containing "MSFT." The Q-to-Q graph formation component 810 can then normalize the vectors such that they are more readily comparable with each other, e.g., such that all such vectors have an L2 norm equal to 1. The Q-to-Q graph formation component 810 can compute a similarity score for each pairing of normalized vectors using any distance metric, e.g., using cosine similarity, Jaccard similarity, inner product, etc. The Q-to-Q graph formation component 810 stores a query-to-query (Q-to-Q) graph in a data store 812 that collectively represents the outcome of its operation. A link between any pair of queries in the Q-to-Q graph represents a relationship between these queries, having a strength determined in the above-described manner.

A clustering component 814 identifies one or more groups of related queries in the Q-to-Q graph. The clustering component 814 can perform this operation using any graph-clustering algorithm, such as, but not limited to, a modularity maximization technique. The modularity of a subgraph within a more encompassing main graph generally refers to a number of edges in the subgraph, relative to a number of edges that would be present based on a purely random distribution of edges. Background information on the isolated topic of clustering via modularity maximization can be found in a number of sources, such as Newman, et al., "Finding and evaluating community structure in networks," in arXiv:cond-mat/0308217v1 (cond-mat.stat-mech), Aug. 11, 2003, 16 pages.

The clustering component 814 stores a set of expanded names in a data store 816. Each expanded name can correspond to a grouping of related text terms. For the verified brand name "MICROSOFT," the expanded brand name can include the entries: "MICROSOFT," "MSFT," "MS," etc. The clustering component 814 can represent each expanded name in any manner, such as by selecting a canonical name for the node (e.g., "MICROSOFT" in the above case), or by assigning a cluster ID to the node.

In one implementation, the clustering component 814 can perform the augmentation process for each verified name by finding a cluster that contains this name as a member. The clustering component 814 can produce an expanded name for this verified name that includes the verified name together with all of the other terms within the identified cluster. For example, the clustering component 814 will find the cluster which contains the verified brand name "MICROSOFT," and then supplement this term with the other terms within the same cluster, which may include "MSFT," "MS," etc.

A post-processing component 818 can remove names in the clusters that fail to satisfy prescribed rules. For example, the post-processing component 818 can remove a name if it contains a prohibited term that suggests it is not a valid name. A data store can store a list of such prohibited terms. A developer can manually produce that list, and/or a machine-learned model can generate the list. For example, the post-processing component 818 may remove the name if it contains any of the words "awful," "terrible," etc., as it is likely that a user who submits a query that contains such a word is proffering an opinion, rather than simply trying to describe a brand or product. The post-processing component 818 stores the results of its processing in a data store 820. Those results constitute a noise-reduced version of the expanded names in the data store 816.

Note that FIG. 8 shows two or more instantiations of an expansion component, including at least a first expansion component 822 and a second expansion component 824. Each instantiation of the expansion component includes the above-described components (804, 808-820).

In one implementation, the first expansion component 822 performs the above-described operations with respect to a first subset of URLs in the query-click log (in the data store 806), while the second expansion component 824 performs the same operations with respect to a second subset of URLs in the query-click log. For example, the first expansion component 822 can consider all of the URLs that users clicked on in response to submitting an identified group of queries, without restriction. The second expansion component 824 can consider only the URLs associated with a limited number of social network sites that users clicked on in response to submitting the identified group of queries.

For example, assume that users clicked on a first URL associated with a blog site in response to submitting a query containing the term "XBOX." Users also clicked on a social network page associated with the product MICROSOFT XBOX after submitting the same query. For instance, that page may be hosted by FACEBOOK, INC. of Menlo Park, Calif. The first expansion component 822 will take into consideration both URLs when performing its aggregating operation, that is, by extracting the blog-related URL and the FACEBOOK URL. But the second expansion component 824 will take into consideration only the FACEBOOK page URL.

As an end result, the second expansion component 824 will generate a group of related names for a given seed name (e.g., "XBOX") that are more closely synonymous with the seed text term, compared to the first expansion component 822. This is because a user who clicks on a social network page after submitting a term is most likely attempting to directly specify a brand or a product, rather than to perform some other transaction that relates to the brand or product.

The post-processing component 818 in the context of the second expansion component 824 can perform the additional task of removing any term that appears to be targeting a social network site itself, rather than describing a brand or service. For example, assume that a user enters the query "XBOX TWITTER" in an attempt to find a page devoted to the XBOX game console provided by Microsoft Corporation. The post-processing component 818 can strip off any descriptive term (here, "TWITTER") that the user enters to describe the social network site itself, rather than the product of interest. A data store can store a list of "noise" words that should be removed in this manner.

A merging component 826 forms the union of the expanded names generated by the first expansion component 822 and the expanded names generated by the second expansion component 824. The merging component 826 stores a result set of expanded names in a data store 828. The two expansion components (822, 824) produce different sets of augmented names because clustering performed on a more diffuse set of URLs produces a different clustering result than clustering performed on a more narrowly defined set of URLs. Further, the first expansion component 822 may apply one or more environment-specific restrictions that are not applied in the second expansion component 824, and vice versa.

The augmentation component 802 can optionally take timestamp information into account in different ways. In one example, the Q-to-Q graph formation component 810 can discount the frequency information associated with website clicks based on the timing at which each click occurred, relative to a current time. This will have the effect of progressively diminishing the relevance of clicks with age.

A.5. The Edge Formation Component

Figure 9:
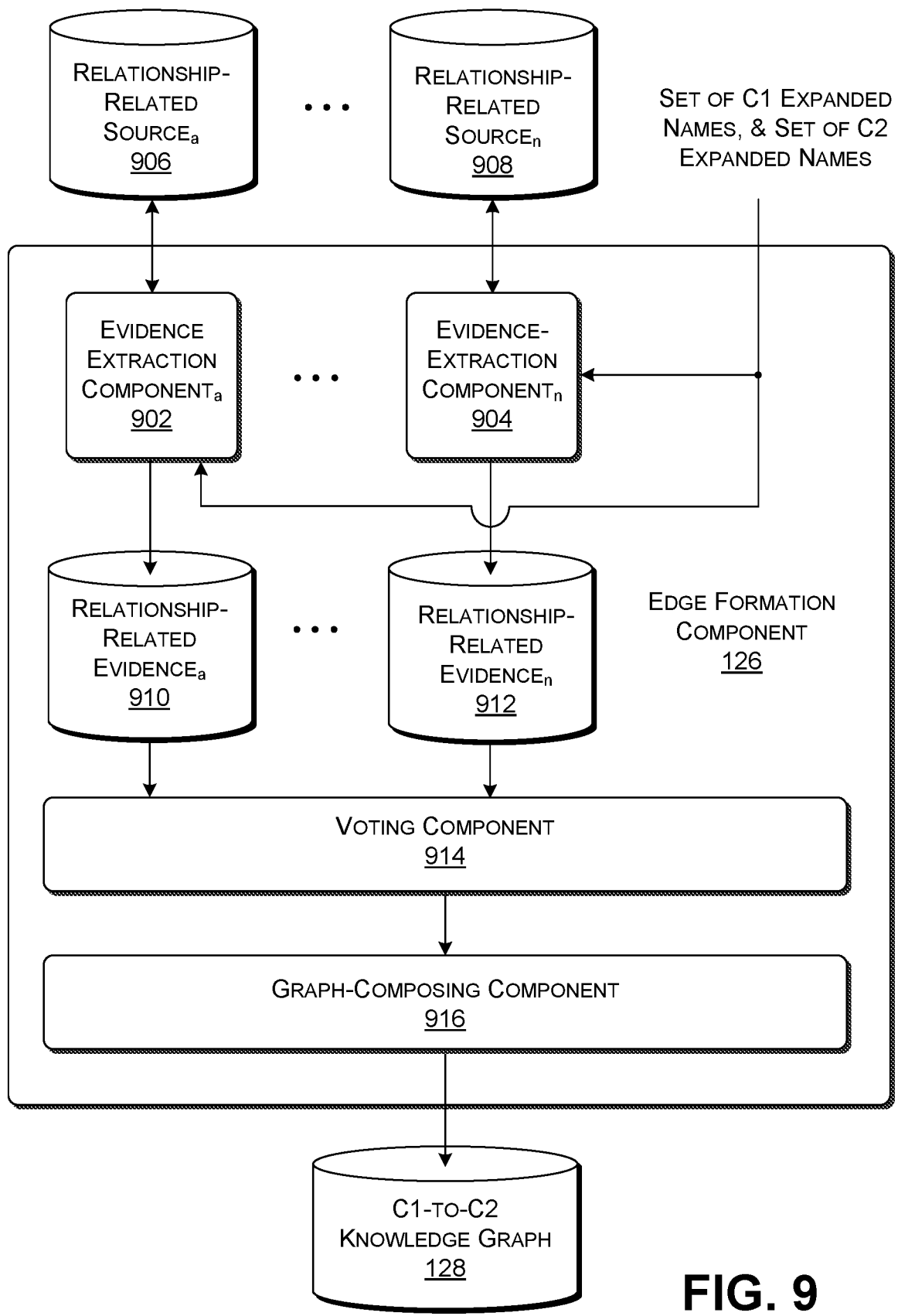
FIG. 9 shows an edge formation component, which is another component used by the graph creation system of FIG. 1.

FIG. 9 shows one implementation of the edge formation component 126 introduced in the context of FIG. 1. The edge formation component 126 determines the relationship between each pairing of a particular expanded brand name (corresponding to a brand node) and a particular product name (corresponding to a product node). As pictorially shown in FIG. 2, that relationship corresponds to one link in the resultant query-to-product knowledge graph, provided in the data store 128.

Different evidence-extraction components (902, . . . , 904) extract evidence from respective relationship-related sources provided in data stores (906, . . . , 908). Each instance of evidence provides a judgment as to the strength of a link between a specified expanded brand name and a specified product name.

For example, a first evidence-extraction component 902 can examine titles in a corpus of documents, such as titles associated with a database of ads. Consider the operation of the evidence-extraction component 902 for a particular brand node and a particular product node, where each such node represents a grouping of related names. For that pairing of nodes, the evidence-extraction component 902 counts the number of occasions in which a title of an ad contains both a brand name and a product name associated with the pairing. For example, assume that the brand node is associated with the name "MICROSOFT," and the product node is associated with the name "WINDOWS 10". The first evidence-extraction component 902 will count how many times that these two names (or their related terms) appear in the same ad title, as in the illustrative title, "Microsoft announces an upgrade to Windows 10 in March." The first evidence-extraction component 902 can use any matching criteria to perform this task, such as exact match, edit distance, etc. The first evidence-extraction component 902 stores information regarding its investigation in a data store 910.

A second evidence-extraction component 904 can consult some other source to determine whether a particular brand node is related to a particular product node. For example, the second evidence-extraction component 904 can consult a preexisting knowledgebase (such as Wikipedia, etc.) to reach this conclusion. For instance, a Wikipedia page may establish a relationship between a brand name and a product name if the body of its description includes both of these names. In addition, or alternatively, the Wikipedia page may provide structured information which links the product name to the brand name. The second evidence-extraction component 904 stores the results of its investigation in a data store 912.

A voting component 914 can assign a score to each link based on the evidence contained in the data stores (910, . . . , 912). In one example, the voting component 914 calculates a vote value that indicates a number or a ratio of sources that support a conclusion that two nodes are connected. The voting component 914 can also take into account the frequency value provided by the first evidence-extraction component 902 in making its decision. In one case, the frequency value is based on a number of times names associated with two nodes under consideration appear in the same ad title. A graph-composing component 916 performs the task of actually creating links based on the determinations of the voting component 914, e.g., by storing data that indicates that the links exist.

More specifically, in one implementation, the voting component 914 can use one or more discrete rules to determine whether or not to establish a link between two nodes. For example, the voting component 914 can decide to draw a link if either of the evidence-extraction components (902, 904) support the existence of the relationship between the nodes. Or the voting component 914 can decide to draw a link if at least one of the evidence-extraction components (902, 904) support that conclusion.

In another example, the voting component 914 can generate a score for two augmented candidate nodes using a machine-learned model based on a plurality of feature values. One such feature value is the above-described vote value. The voting component 914 can then decide to draw a link between the two augmented candidate nodes if the score is above an environment-specific threshold value. The strength of that link, if drawn, corresponds to its score.

The edge formation component 126 can optionally take timestamp information into account in different ways. For example, the first evidence-extraction component 902 can store timestamp information for each ad that meets its test, corresponding to a time at which the ad was created, and/or when the ad was last served, etc. The voting component 914 can discount the contribution of an ad based on the timestamp associated with the ad, relative to a current time. This will have the effect of progressively diminishing the relevance of ads with age.

More generally, the above description set forth examples of how the graph creation system 104 can use timestamp information to weight the relevance of individual names and relations in the knowledge graph. In addition, the graph creation system 104 can preserve time information associated with each node and relation in the knowledge graph. The time information of a node can correspond to some statistical measure (such as an average) of the timestamp information associated with the evidence that was used to establish the existence of the node. Similarly, the time information for an edge can derive from some statistical measure of the timestamp information associated with the evidence that was used to establish the existence and strength of the link.

An application system can leverage this time information associated with a node or link in different ways. For example, a search system can leverage the time information associated with product nodes to identify a sequence of model names associated with a family of products provided by a particular manufacturer. For example, assume that a user asks, "What is the name of MICROSOFT's operating system?" The search system can leverage a timestamped knowledge graph to reply: "XP, VISTA, WINDOWS 7, WINDOWS 8.1, and WINDOWS 10."

Note that this subsection has described the operation of the edge formation component 126 in the illustrative context of establishing links between C1 nodes and C2 nodes, where the C2 nodes correspond to a different category (e.g., products) with respect to the C1 nodes (e.g., brands). But the edge formation component 126 can also establish relationships between nodes associated with the same category. In this context, for instance, an ad title that contains two brand names constitutes evidence that these two brand names are related, such as with respect to a hypothetical ad title that touts a first product as being superior to a second product.

Indeed, referring back to FIG. 1, the graph formation component 104 has utility in the scenario in which there is only one processing pipeline. The objective in that case would be to generate a set of expanded names associated with a single category, and then establish links between those associated nodes.

A.6. Post-Processing Component

As set forth in Subsection A.1, the post-processing component 130 refines an initial brand-to-product knowledge graph based on one or more strategies. In one strategy, the post-processing component 130 can instruct the graph creation system 104 to repeat its analysis on a periodic basis, a demand-driven basis, or any other basis. That is, the post-processing component 130 can: command the first processing pipeline 108 to apply its three-stage process to identify new brand nodes; command the second processing pipeline 110 to apply its three-stage process to identify new product nodes; and command the edge formation component 126 to identify edges between the thus-discovered new nodes.

Note that the post-processing component 130 can command the first processing pipeline 108 to generate new brand nodes on a less frequent basis than it commands the second processing pipeline 110 to generate new product nodes. This is because the brand nodes can be considered more stable (less subject to variation) than the product nodes. Further note that the post-processing component 130 can perform the edge formation operation independently of the processing performed by either of the processing pipelines (108, 110).

Further note that, in re-performing any three-phase operation, the graph creation component 104 can apply various strategies to avoid repeating work with respect to an already identified node, particularly with respect to a node that represents a relatively stable entity. For example, when first generating brand-related nodes, assume that the first processing pipeline 108 generates an augmented node associated with the business entity MICROSOFT CORPORATION. This node can be expected to remain relatively stable over time. In view thereof, the first processing pipeline 108 can avoid some or all of the work pertaining to this node. For example, the first processing pipeline 108 can skip the step of verifying whether the name MICROSOFT CORPORA- TION has an online presence, as this fact has already been adequately verified. The first processing pipeline 108 can also avoid collecting and analyzing information regarding variants of the name MICROSOFT CORPORATION that have already been identified and analyzed.

In another strategy, the post-processing component 130 can also refine various parameter values associated with an already-generated knowledge graph. The graph creation system 104 can use the refined parameters to re-compute one or more aspects of an already generated knowledge graph. Alternatively, or in addition, the graph creation system 104 can apply the refined parameters to the task of generating a new knowledge graph.

For example, the post-processing component 130 can collect evidence as to the reliability of a source that contributes to brand names or product names. The post-processing component 130 can leverage that evidence to increase or decrease the relevance-based weight value associated with that source for each respective processing pipeline. For example, based on evidence that a particular seed source is delivering high quality brand names, the post-processing component 130 can increase a relevance-based weight value assigned to this seed source within the generation component 112 of the first processing pipeline 112.

In another strategy, the post-processing component 130 can also collect evidence as to the importance of each feature that contributes to an assessment of link strength between any two nodes in an initial knowledge graph. The post-processing component 130 can leverage this evidence to increase or decrease the weight value associated with each feature in the edge-formation operation. For example, consider the illustrative and non-limiting example in which the edge-formation component 126 generates a score that describes the strength of a link based on a linear combination of weighted feature values. Here, the edge-formation component 126 can leverage evidence as to the importance of a feature by increasing or decreasing the value of a weight value associated with this feature in the weighted sum. This operation may result in creating new links between nodes and/or removing previously-identified links between nodes. More generally, the post-processing component 130 can apply this strategy to re-compute weight values used in any component within the graph creation system 104, such as the weight values applied by the ranking component 504 used by the product generation component 118.

The post-processing component 130 can also collect evidence that any two nodes pertain to the same entity. The computing system 102 can leverage this knowledge by merging the nodes together to form a single node.

The post-processing component 130 can collect the above-described evidence in different environment-specific ways. For example, the post-processing component 130 can collect empirical evidence as to the success of the knowledge graph in performing whatever application task(s) to which it has been applied. For example, consider an ad-serving platform that uses a brand-to-product knowledge graph to serve ads to end users based on queries submitted by the end users. The click behavior of the end users provides evidence as to whether the presumed relations in the brand-to-product graph are valid. Similarly, consider a personal digital assistant that uses the brand-to-product knowledge graph to answer queries by end users pertaining to brands. The interaction between end users and the personal digital assistant provides evidence as to whether the relations in the brand-to-product graph are correct.

The post-processing component 130 can use known machine-learning techniques to update various parameter values based on the above-described evidence. For instance, the post-processing component 130 can use a gradient descent technique to iteratively operate on a training dataset that represents the above-described kinds of empirical evidence, with a goal of approximating the relationships implicitly expressed in the training dataset. The post-processing component 130 can also use machine-learning techniques to refine the weight values even in the absence of the above-described empirical evidence, e.g., by treating the relationships expressed in an initial graph as established "ground truths," and iteratively refining the weight values to more accurately reflect these ground truths.

The post-processing component 130 can determine that two nodes pertain to the same entity by determining if the two nodes share the same linking behavior, with respect to any metric of similarity (e.g., cosine similarity). For example, assume that an initial knowledge graph includes two nodes that actually pertain to the same product. Those two nodes can be expected to link to the same brands, which constitutes evidence that the two product nodes describe the same entity.

B. Illustrative Processes

FIGS. 10-12 together show a process 1002 that explains the operation of the computing environment 102 of Section A in flowchart form. Since the principles underlying the operation of the computing environment 102 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

More specifically, FIG. 10 shows operations performed by the first processing pipeline 108 of FIG. 1. In block 1004, the generation component 112 generates a set of seed first-category (C1) names associated with a first subject matter category (e.g., correspond to brand names). The generating operation involves collecting two or more sets of candidate C1 names from respective C1 seed sources, and using a voting component to generate the set of seed C1 names based on the set(s) of candidate C1 names. In block 1006, the verification component 114 verifies whether the seed C1 names have a prescribed presence with respect to an online community, to generate a set of verified C1 names. In block 1008, the augmentation component 116 augments each verified C1 name in the set of verified C1 names by performing clustering on query information derived from a query-click log, to overall generate a set of expanded C1 names.

FIG. 11 shows operations performed by the second processing pipeline 110 of FIG. 1 which are complementary to the operations shown in FIG. 10. In block 1102, the generation component 118 generates a set of seed second-category (C2) names associated with a second subject matter category (e.g., corresponding to product names). That generating operation involves collecting two or more sets of candidate C2 names from respective C2 seed sources of seed information, and using a voting component to generate the set of seed C2 names based on the set(s) of candidate C2 names. In block 1104, the verification component 120 verifies whether the seed C2 names have a prescribed presence with respect to an online community, to generate a set of verified C2 names. In block 1106, the augmentation component 122 augments each verified C2 name in the set of verified C2 names by performing clustering on query information derived from the query-click log, to overall generate a set of expanded C2 names.

In block 1202 of FIG. 12, the edge formation component 126 forms edges between pairs of nodes associated with the set of expanded C1 names and the set of expanded C2 names, to produce a knowledge graph. Each edge connects a particular expanded C1 name and a particular expanded C2 name. In block 1204, the post-processing component 130 optionally refines the knowledge graph using any of the strategies set forth in Subsection A.6. In block 1206, the knowledgebase integration component 132 transfers the knowledge graph to an application system for use thereat in answering user input queries.

More generally stated, block 1202 involves forming edges between C1 nodes associated with the set of expanded C1 names and other nodes. The other nodes are associated with the first subject matter category, and/or the other nodes are associated with at least one other subject matter category that differs from the first subject matter category. In the former case, the process 1002 can omit the operations shown in FIG. 11. For instance, the process can apply the operations in FIG. 10 to establish a set of expanded product names, and then apply the process of FIG. 12 to establish links between nodes associated with the expanded product names.

FIG. 12 also describes one application of the knowledge graph computed in block 1202, and refined in block 1204. In block 1208, an application system receives an input query from a user computing device 140. In block 1210, the application system uses the knowledge graph to provide an answer to the input query. Block 1210 is intended to encompass a wide variety of operations, including a knowledgebase lookup operation, a knowledgebase query-reasoning operation, a query enhancement operation, an ad selection operation, and so on. In block 1212, the application system sends the answer to the user computing device 140.

C. Representative Computing Functionality

Figure 13:
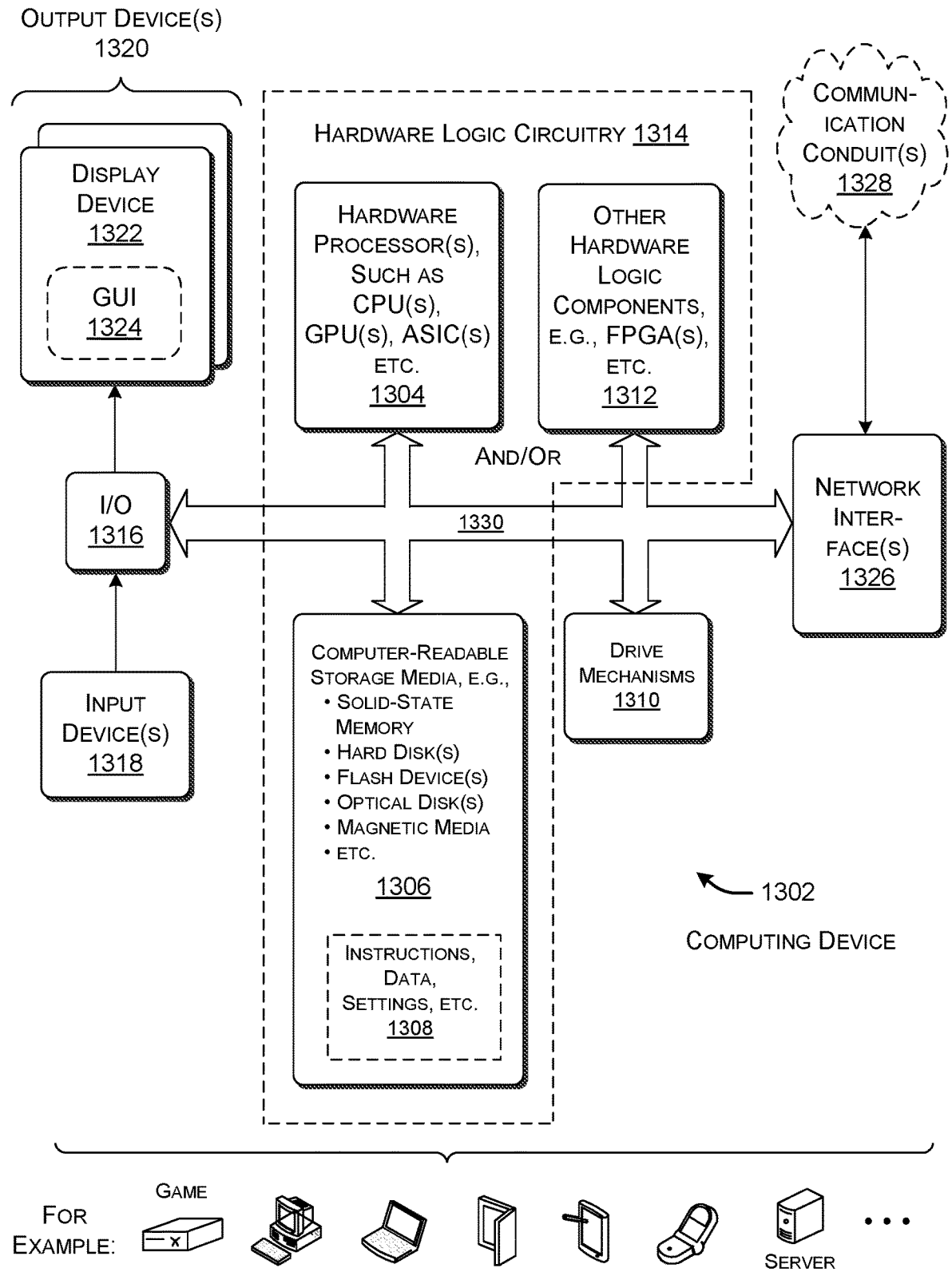
FIG. 13 shows an illustrative type of computing device that can be used to implement any aspect of the features shown in the foregoing drawings.

FIG. 13 shows a computing device 1302 that can be used to implement any aspect of the mechanisms set forth in the above-described figures. For instance, with reference to FIG. 3, the type of computing device 1302 shown in FIG. 13 can be used to implement any computing device of the graph creation system 104, any computing device of the application system(s) 106, and any user computing device, etc. In all cases, the computing device 1302 represents a physical and tangible processing mechanism.

The computing device 1302 can include one or more hardware processors 1304. The hardware processor(s) can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1302 can also include computer-readable storage media 1306, corresponding to one or more computer-readable media hardware units. The computer-readable storage media 1306 retains any kind of information 1308, such as machine-readable instructions, settings, data, etc. Without limitation, for instance, the computer-readable storage media 1306 may include one or more solid-state devices, one or more flash devices, one or more magnetic hard disks, one or more optical disks, magnetic tape, and so on. Any instance of the computer-readable storage media 1306 can use any technology for storing and retrieving information. Further, any instance of the computer-readable storage media 1306 may represent a fixed or removable component of the computing device 1302. Further, any instance of the computer-readable storage media 1306 may provide volatile or non-volatile retention of information.

The computing device 1302 can utilize any instance of the computer-readable storage media 1306 in different ways. For example, any instance of the computer-readable storage media 1306 may represent a hardware memory unit (such as Random Access Memory (RAM)) for storing transient information during execution of a program by the computing device 1302, and/or a hardware storage unit (such as a hard disk) for retaining/archiving information on a more permanent basis. In the latter case, the computing device 1302 also includes one or more drive mechanisms 1310 (such as a hard drive mechanism) for storing and retrieving information from an instance of the computer-readable storage media 1306.

The computing device 1302 may perform any of the functions described above when the hardware processor(s) 1304 carry out computer-readable instructions stored in any instance of the computer-readable storage media 1306. For instance, the computing device 1302 may carry out computer-readable instructions to perform each block of the processes described in Section B.

Alternatively, or in addition, the computing device 1302 may rely on one or more other hardware logic components 1312 to perform operations using a task-specific collection of logic gates. For instance, the hardware logic component(s) 1312 include a fixed configuration of hardware logic gates, e.g., that are created and set at the time of manufacture, and thereafter unalterable. Alternatively, or in addition, the other hardware logic component(s) 1312 include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 13 generally indicates that hardware logic circuitry 1314 corresponds to any combination of the hardware processor(s) 1304, the computer-readable storage media 1306, and/or the other hardware logic component(s) 1312. That is, the computing device 1302 can employ any combination of the hardware processor(s) 1304 that execute machine-readable instructions provided in the computer-readable storage media 1306, and/or one or more other hardware logic component(s) 1312 that perform operations using a fixed and/or programmable collection of hardware logic gates.

In some cases (e.g., in the case in which the computing device 1302 represents a user computing device), the computing device 1302 also includes an input/output interface 1316 for receiving various inputs (via input devices 1318), and for providing various outputs (via output devices 1320). Illustrative input devices include a keyboard device, a mouse input device, a touchscreen input device, a digitizing pad, one or more static image cameras, one or more video cameras, one or more depth camera systems, one or more microphones, a voice recognition mechanism, any movement detection mechanisms (e.g., accelerometers, gyroscopes, etc.), and so on. One particular output mechanism may include a display device 1322 and an associated graphical user interface presentation (GUI) 1324. The display device 1322 may correspond to a liquid crystal display device, a light-emitting diode display (LED) device, a cathode ray tube device, a projection mechanism, etc. Other output devices include a printer, one or more speakers, a haptic output mechanism, an archival mechanism (for storing output information), and so on. The computing device 1302 can also include one or more network interfaces 1326 for exchanging data with other devices via one or more communication conduits 1328. One or more communication buses 1330 communicatively couple the above-described components together.

The communication conduit(s) 1328 can be implemented in any manner, e.g., by a local area computer network, a wide area computer network (e.g., the Internet), point-to-point connections, etc., or any combination thereof. The communication conduit(s) 1328 can include any combination of hardwired links, wireless links, routers, gateway functionality, name servers, etc., governed by any protocol or combination of protocols.

FIG. 13 shows the computing device 1302 as being composed of a discrete collection of separate units. In some cases, the collection of units may correspond to discrete hardware units provided in a computing device chassis having any form factor. FIG. 13 shows illustrative form factors in its bottom portion. In other cases, the computing device 1302 can include a hardware logic component that integrates the functions of two or more of the units shown in FIG. 1. For instance, the computing device 1302 can include a system-on-a-chip (SoC or SOC), corresponding to an integrated circuit that combines the functions of two or more of the units shown in FIG. 13.

The following summary provides a non-exhaustive set of illustrative aspects of the technology set forth herein.

According to a first aspect, one or more computing devices are described for generating a knowledge graph. The computing device(s) include hardware logic circuitry, the hardware logic circuitry corresponding to: (a) one or more hardware processors that perform operations by executing machine-readable instructions stored in a memory, and/or by (b) one or more other hardware logic components that perform operations using a task-specific collection of logic gates. The hardware logic circuitry performs the operations in a first and second processing pipelines.

The first processing pipeline generates a set of seed first-category (C1) names associated with a first subject matter category. The generating operation includes collecting two or more sets of candidate C1 names from respective C1 seed sources of seed information, and using a voting component to generate the set of seed C1 names based on the above-mentioned two or more sets of candidate C1 names. The first processing pipeline also: verifies whether the seed C1 names have a prescribed presence with respect to an online community, to generate a set of verified C1 names; and augments each verified C1 name in the set of verified C1 names by performing clustering on query information derived from a query-click log, to overall generate a set of expanded C1 names.

The second processing pipeline generates a set of seed second-category (C2) names associated with a second subject matter category. The generating operation performed by the second processing pipeline includes collecting two or more sets of candidate C2 names from respective C2 seed sources of seed information, and using a voting component to generate the set of seed C2 names based on the above-mentioned two or more sets of candidate C2 names. The second processing pipeline also: verifies whether the seed C2 names have a prescribed presence with respect to an online community, to generate a set of verified C2 names; and augments each verified C2 name in the set of verified C2 names by performing clustering on query information derived from the query-click log, to overall generate a set of expanded C2 names.

The operations performed by the hardware logic circuitry also include forming edges between pairs of nodes associated with the set of expanded C1 names and the set of expanded C2 names, to produce a knowledge graph. For at least some of the edges, each such edge connects a particular expanded C1 name and a particular expanded C2 name.

According to a second aspect, the first subject matter category corresponds to brand names, and the second subject matter category corresponds to product names.

According to a third aspect, at least the C1 seed sources include: one or more preexisting knowledge resources, each of which provides information regarding candidate C1 names; and/or one or more merchant-related network-accessible sites, each of which provides information regarding candidate C1 names.

According to a fourth aspect, at least the C2 seed sources include: a query log that provides queries that contain candidate C2 names; and/or a browser behavior log that provides site address information regarding queries that contain candidate C2 names that users have submitted to merchant-related network-accessible sites; and/or a data store that provides at least titles associated with a collection of documents, the titles containing candidate C2 names.

According to a fifth aspect, the voting component of at least the first processing pipeline is configured to assess an appropriateness of a particular C1 candidate name based on: a number of C1 seed sources in which the particular candidate C1 name appears, relative to a total number of C1 seed sources that have been considered.

According to a sixth aspect, the voting component of at least the second processing pipeline is configured to assess an appropriateness of a particular candidate C2 name based on: a number of C2 seed sources in which the particular candidate C2 name appears, relative to a total number of C2 seed sources that have been considered; and/or a frequency at which the particular candidate C2 name appears within each C2 seed source; and/or a level of variation in category-related contexts in which the particular candidate C2 name appears; and/or part-of-speech information associated with the particular candidate C2 name; and/or an indication of whether the particular candidate C2 name includes at least one prescribed positive key term and/or negative key term.

According to a seventh aspect, the verifying operation performed by at least the first processing pipeline includes determining whether there is an established network domain associated with a particular seed C1 name.

According to an eighth aspect, the aggregating operation performed by at least the first processing pipeline includes: providing a query-to-site (Q-to-S) graph based on information contained in the query-click log; generating a query-to-query (Q-to-Q) graph by identifying relationships among verified C1 names that appears in the Q-to-S graph; and clustering the Q-to-Q graph to generate one or more groups of related C1 names, each group being associated with an expanded C1 name.

According to a ninth aspect, the aggregating performed by at least the first processing pipeline includes: generating a first set of expanded C1 names associated with a first subset of network-accessible site addresses; generating a second set of expanded C1 names associated with a second subset of network-accessible site addresses, wherein the site addresses in the second subset of network-accessible site addresses are more narrowly drawn compared to the site addresses in the first subset of network-accessible site addresses; and merging the first set of expanded C1 names with the second set of expanded C1 names to generate a final set of expanded C1 names.

According to a tenth aspect, dependent on the ninth aspect, the site addresses in the second subset of network-accessible site addresses are associated with social network sites.

According to an eleventh aspect, the forming of edges operation includes, for each candidate pairing of a particular expanded C1 name and a particular expanded C2 name: collecting evidence pertaining to a strength of a relationship between the particular expanded C1 name and the particular expanded C2 name from one or more relationship-related sources; and using a forming-stage voting component to determine the strength of the relationship based on the evidence that has been collected.

According to a twelfth aspect, dependent on the eleventh aspect, one relationship-related source corresponds to a data store that provides titles associated with a collection of documents. Further, a title that matches both the particular expanded C1 name and the particular expanded C2 name constitutes positive evidence that the particular expanded C1 name is related to the particular expanded C2 name.

According to a thirteenth aspect, dependent on the twelfth aspect, another relationship-related source corresponds to a preexisting knowledge resource that provides information regarding the relationship between the particular expanded C1 name and the particular expanded C2 name.

According to a fourteenth aspect, in an application phase, the operations performed by the hardware logic circuitry include: receiving an input query from a user computing device; using the knowledge graph to provide an answer to the input query; and sending the answer to the user computing device.

According to a fifteenth aspect, a method is described for generating a knowledge graph. The method includes operations performed by first and second processing pipelines, each implemented by one or more computing devices. In the first processing pipeline, the method includes generating a set of seed first-category (C1) names associated with a first subject matter category. The generating operation includes collecting two or more sets of candidate C1 names from respective C1 seed sources of seed information, and using a voting component to generate the set of seed C1 names based on the above-mentioned two or more sets of candidate C1 names. The first processing pipeline also: verifies whether the seed C1 names have a prescribed presence with respect to an online community, to generate a set of verified C1 names; and augments each verified C1 name in the set of verified C1 names by performing clustering on query information derived from a query-click log, to generate a set of expanded C1 names.

In the second processing pipeline, the method includes generating a set of seed second-category (C2) names associated with a second subject matter category. The generating operation performed by the second processing pipeline includes collecting two or more sets of candidate C2 names from respective C2 seed sources of seed information, and using a voting component to generate the set of seed C2 names based on the above-mentioned two or more sets of candidate C2 names. The second processing pipeline also: verifies whether the seed C2 names have a prescribed presence with respect to an online community, to generate a set of verified C2 names; and augments each verified C2 name in the set of verified C2 names by performing clustering on query information derived from the query-click log, to overall generate a set of expanded C2 names.

The method further includes: forming edges between pairs of nodes associated with the set of expanded C1 names and the set of expanded C2 names, to produce a knowledge graph. For at least some edges, each such edge connects a particular expanded C1 name and a particular expanded C2 name. The method further includes transferring the knowledge graph to an application system for use thereat in answering user input queries.

According to a sixteenth aspect, dependent on the fifteenth aspect, the first subject matter category corresponds to brand names, and the second subject matter category corresponds to product names.

According to a seventeenth aspect, dependent on the fifteenth aspect, the aggregating operation performed by at least the first processing pipeline includes: generating a first set of expanded C1 names associated with a first subset of network-accessible site addresses; generating a second set of expanded C1 names associated with a second subset of network-accessible site addresses, wherein the site addresses in the second subset of network-accessible site addresses are associated with social network sites, and wherein the site addresses in the second subset of network-accessible site addresses are more narrowly drawn compared to the first subset of network-accessible site addresses; and merging the first set of expanded C1 names with the second set of expanded C1 names to generate the set of expanded C1 names.

According to an eighteenth aspect, dependent on the fifteenth aspect, the forming of edges operation includes, for each candidate pairing of a particular expanded C1 name and a particular expanded C2 name: collecting evidence pertaining to a strength of a relationship between the particular expanded C1 name and the particular expanded C2 name from one or more relationship-related sources; and using an edge-forming-stage voting component to determine the strength of the relationship based on the evidence that has been collected. One relationship-related source corresponds to a data store that provides at least titles associated with a collection of documents, wherein a title that contains both the particular expanded C1 name and the particular expanded C2 name constitutes positive evidence that the particular expanded C1 name is related to the particular expanded C2 name.

According to a nineteenth aspect, the method of the fifteenth aspect further includes: receiving, by the application system, an input query from a user computing device; using, by the application system, the knowledge graph to provide an answer to the input query; and sending, by the application system, the answer to the user computing device.

According to a twentieth aspect, a computer-readable storage medium for storing computer-readable instructions is described. The computer-readable instructions, when executed by one or more hardware processors, perform a method that includes: generating a set of seed first-category (C1) names associated with a first subject matter category, wherein the generating operation includes collecting two or more sets of candidate C1 names from respective C1 seed sources of seed information, and using a voting component to generate the set of seed C1 names based on the above-mentioned two or more sets of candidate C1 names; verifying whether the seed C1 names have a prescribed presence with respect to an online community, to generate a set of verified C1 names; augmenting each verified C1 name in the set of verified C1 names by performing clustering on query information derived from a query-click log, to generate a set of expanded C1 names; and forming edges between C1 nodes associated with the set of expanded C1 names and other nodes, the other nodes being associated with the first subject matter category, and/or the other nodes being associated with at least one other subject matter category that differs from the first subject matter category.

A twenty-first aspect corresponds to any combination (e.g., any permutation or subset that is not logically inconsistent) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing/anonymizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for generating a knowledge graph, comprising:
hardware logic circuitry, the hardware logic circuitry corresponding to: (a) one or more hardware processors that perform operations by executing machine-readable instructions stored in a memory, and/or (b) one or more other hardware logic components that perform operations using a task-specific collection of logic gates, the operations including:
in a first processing pipeline:
generating a set of seed first-category (C1) names associated with a first subject matter category, said generating including collecting two or more sets of candidate C1 names from respective C1 seed sources of seed information, and using a voting component provided by the first processing pipeline to generate the set of seed C1 names based on said two or more sets of candidate C1 names;
verifying whether the seed C1 names have a prescribed presence with respect to an online community, to generate a set of verified C1 names; and
augmenting each verified C1 name in the set of verified C1 names, to overall generate a set of expanded C1 names that includes synonyms of said each verified C1 name;
in a second processing pipeline:
generating a set of seed second-category (C2) names associated with a second subject matter category, said generating performed by the second processing pipeline including collecting two or more sets of candidate C2 names from respective C2 seed sources of seed information, and using a voting component provided by the second processing pipeline to generate the set of seed C2 names based on said two or more sets of candidate C2 names;
verifying whether the seed C2 names have a prescribed presence with respect to the online community, to generate a set of verified C2 names; and
augmenting each verified C2 name in the set of verified C2 names, to overall generate a set of expanded C2 names that includes synonyms of said each verified C2 name; and
forming edges between pairs of nodes associated with the set of expanded C1 names and the set of expanded C2 names, to produce a knowledge graph,
for at least some of the edges, each such edge connecting a particular expanded C1 name and a particular expanded C2 name,
wherein said forming of edges comprises, for each candidate pairing of a particular expanded C1 name and a particular expanded C2 name:
collecting evidence pertaining to a strength of a relationship between the particular expanded C1 name and the particular expanded C2 name from one or more relationship-related sources; and
using a forming-stage voting component provided by the hardware logic circuitry to determine the strength of the relationship based on the evidence that has been collected.

2. The one or more computing devices of claim 1, wherein the first subject matter category corresponds to brand names, and the second subject matter category corresponds to product names.

3. The one or more computing devices of claim 1, wherein at least the C1 seed sources include:
one or more preexisting knowledge resources, each of which provides information regarding candidate C1 names; and/or
one or more merchant-related network-accessible sites, each of which provides information regarding candidate C1 names.

4. The one or more computing devices of claim 1, wherein at least the C2 seed sources include:
a query log that provides queries that contain candidate C2 names; and/or
a browser behavior log that provides site address information regarding queries that contain candidate C2 names that users have submitted to merchant-related network-accessible sites; and/or
a data store that provides at least titles associated with a collection of documents, the titles containing candidate C2 names.

5. The one or more computing devices of claim 1, wherein the voting component of at least the first processing pipeline is configured to assess a particular C1 candidate name based on:
a number of C1 seed sources in which the particular candidate C1 name appears, relative to a total number of C1 seed sources that have been considered.

6. The one or more computing devices of claim 1, wherein the voting component of at least the second processing pipeline is configured to assess a particular candidate C2 name based on:

a number of C2 seed sources in which the particular candidate C2 name appears, relative to a total number of C2 seed sources that have been considered; and/or a frequency at which the particular candidate C2 name appears within each C2 seed source; and/or a level of variation in category-related contexts in which the particular candidate C2 name appears; and/or part-of-speech information associated with the particular candidate C2 name; and/or an indication of whether the particular candidate C2 name includes at least one prescribed positive key term and/or negative key term.

7. The one or more computing devices of claim 1, wherein said verifying performed by at least the first processing pipeline includes determining whether there is an established network domain associated with a particular seed C1 name.

8. The one or more computing devices of claim 1, wherein said augmenting performed by at least the first processing pipeline includes:

providing a query-to-site (Q-to-S) graph based on information contained in a query-click log;

generating a query-to-query (Q-to-Q) graph by identifying relationships among verified C1 names that appears in the Q-to-S graph; and clustering the Q-to-Q graph to generate one or more groups of related C1 names, each group being associated with an expanded C1 name.

9. The one or more computing devices of claim 1, wherein said augmenting performed by at least the first processing pipeline includes:

generating a first set of expanded C1 names associated with a first subset of network-accessible site addresses;

generating a second set of expanded C1 names associated with a second subset of network-accessible site addresses, wherein the site addresses in the second subset of network-accessible site addresses are more narrowly drawn compared to the site addresses in the first subset of network-accessible site addresses; and merging the first set of expanded C1 names with the second set of expanded C1 names to generate a final set of expanded C1 names.

10. The one or more computing devices of claim 9, wherein the site addresses in the second subset of network-accessible site addresses are associated with social network sites.

11. The one or more computing devices of claim 1, wherein one relationship-related source corresponds to a data store that provides titles associated with a collection of documents, and wherein a title that matches both the particular expanded C1 name and the particular expanded C2 name constitutes positive evidence that the particular expanded C1 name is related to the particular expanded C2 name.

12. The one or more computing devices of claim 11, wherein another relationship-related source corresponds to a preexisting knowledge resource that provides information regarding the relationship between the particular expanded C1 name and the particular expanded C2 name.

13. The one or more computing devices of claim 1, wherein, in an application phase, the operations performed by the hardware logic circuitry include:

receiving an input query from a user computing device;

using the knowledge graph to provide an answer to the input query; and sending the answer to the user computing device.

14. A method for generating a knowledge graph, comprising:

in a first processing pipeline implemented by one or more computing devices:

generating a set of seed first-category (C1) names associated with a first subject matter category, said generating including collecting two or more sets of candidate C1 names from respective C1 seed sources of seed information, and using a voting component provided by the first processing pipeline to generate the set of seed C1 names based on said two or more sets of candidate C1 names;

verifying whether the seed C1 names have a prescribed presence with respect to an online community, to generate a set of verified C1 names; and augmenting each verified C1 name in the set of verified C1 names, to generate a set of expanded C1 names that includes synonyms of said each verified C1 name;

in a second processing pipeline implemented by one or more computing devices:

generating a set of seed second-category (C2) names associated with a second subject matter category, said generating performed by the second processing pipeline including collecting two or more sets of candidate C2 names from respective C2 seed sources of seed information, and using a voting component provided by the second processing pipeline to generate the set of seed C2 names based on said two or more sets of candidate C2 names;

verifying whether the seed C2 names have a prescribed presence with respect to the online community, to generate a set of verified C2 names; and augmenting each verified C2 name in the set of verified C2 names, to overall generate a set of expanded C2 names that includes synonyms of said each verified C2 name;

forming edges between pairs of nodes associated with the set of expanded C1 names and the set of expanded C2 names, to produce a knowledge graph, for at least some edges, each such edge connecting a particular expanded C1 name and a particular expanded C2 name; and transferring the knowledge graph to an application system for use thereat in answering user input queries, wherein said forming of edges comprises, for each candidate pairing of a particular expanded C1 name and a particular expanded C2 name:

collecting evidence pertaining to a strength of a relationship between the particular expanded C1 name and the particular expanded C2 name from one or more relationship-related sources; and using an edge-forming-stage voting component to determine the strength of the relationship based on the evidence that has been collected.

15. The method of claim 14, wherein the first subject matter category corresponds to brand names, and the second subject matter category corresponds to product names.

16. The method of claim 14, wherein said augmenting performed by at least the first processing pipeline includes:

generating a first set of expanded C1 names associated with a first subset of network-accessible site addresses;

generating a second set of expanded C1 names associated with a second subset of network-accessible site addresses, wherein the site addresses in the second subset of network-accessible site addresses are associated with social network sites, and wherein the site addresses in the second subset of network-accessible site addresses are more narrowly drawn compared to the first subset of network-accessible site addresses; and merging the first set of expanded C1 names with the second set of expanded C1 names to generate the set of expanded C1 names.

17. The method of claim 14,
wherein one relationship-related source corresponds to a data store that provides at least titles associated with a collection of documents, and
wherein a title that contains both the particular expanded C1 name and the particular expanded C2 name constitutes positive evidence that the particular expanded C1 name is related to the particular expanded C2 name.

18. The method of claim 14, wherein the method further includes:
receiving, by the application system, an input query from a user computing device;
using, by the application system, the knowledge graph to provide an answer to the input query; and
sending, by the application system, the answer to the user computing device.

19. The method of claim 14, wherein said augmenting performed by at least the first processing pipeline includes:
providing a query-to-site (Q-to-S) graph based on information contained in a query-click log;
generating a query-to-query (Q-to-Q) graph by identifying relationships among verified C1 names that appears in the Q-to-S graph; and
clustering the Q-to-Q graph to generate one or more groups of related C1 names, each group being associated with an expanded C1 name.

20. A computer-readable storage medium for storing computer-readable instructions, the computer-readable instructions, when executed by one or more hardware processors, performing a method that comprises:
generating a set of seed first-category (C1) names associated with a first subject matter category that also have a prescribed presence with respect to an online community, to generate a set of verified C1 names;
augmenting each verified C1 name in the set of verified C1 names by performing clustering on query information derived from a query-click log, to generate a set of expanded C1 names; and
forming edges between C1 nodes associated with the set of expanded C1 names and other nodes, the other nodes being associated with the first subject matter category, and/or the other nodes being associated with at least one other subject matter category that differs from the first subject matter category,
wherein said augmenting performed includes:
providing a query-to-site (Q-to-S) graph based on information contained in the query-click log;
generating a query-to-query (Q-to-Q) graph by identifying relationships among verified C1 names that appears in the Q-to-S graph; and
clustering the Q-to-Q graph to generate one or more groups of related C1 names, each group being associated with an expanded C1 name.

21. A computer-readable storage medium for storing computer-readable instructions, the computer-readable instructions, when executed by one or more hardware processors, performing a method that comprises:
generating a set of seed first-category (C1) names associated with a first subject matter category that also have a prescribed presence with respect to an online community, to generate a set of verified C1 names;
augmenting each verified C1 name in the set of verified C1 names by performing clustering on query information derived from a query-click log, to generate a set of expanded C1 names; and
forming edges between C1 nodes associated with the set of expanded C1 names and other nodes, the other nodes being associated with the first subject matter category, and/or the other nodes being associated with at least one other subject matter category that differs from the first subject matter category,
wherein said forming of edges comprises, for each candidate pairing of a particular expanded C1 name and a particular other name associated with another node:
collecting evidence pertaining to a strength of a relationship between the particular expanded C1 name and the particular other name from one or more relationship-related sources; and
using a forming-stage voting component to determine the strength of the relationship based on the evidence that has been collected.

* * * * *